(12) United States Patent
Alshina et al.

(10) Patent No.: US 8,711,939 B2
(45) Date of Patent: Apr. 29, 2014

(54) METHOD AND APPARATUS FOR ENCODING AND DECODING VIDEO BASED ON FIRST SUB-PIXEL UNIT AND SECOND SUB-PIXEL UNIT

(75) Inventors: Elena Alshina, Suwon-si (KR); Alexander Alshin, Suwon-si (KR); Min-su Cheon, Suwon-si (KR); Woo-jin Han, Suwon-si (KR); Tammy Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 405 days.

(21) Appl. No.: 13/080,121

(22) Filed: Apr. 5, 2011

(65) Prior Publication Data

US 2011/0243233 A1 Oct. 6, 2011

Related U.S. Application Data

(60) Provisional application No. 61/320,837, filed on Apr. 5, 2010.

(30) Foreign Application Priority Data

Jan. 18, 2011 (KR) .......................... 10-2011-0005003

(51) Int. Cl.
*H04N 7/26* (2006.01)

(52) U.S. Cl.
USPC ............ 375/240.16; 375/240.01; 375/240.12; 375/E7.027; 375/E7.105; 375/E7.124

(58) Field of Classification Search
None
See application file for complete search history.

(56) References Cited

U.S. PATENT DOCUMENTS

| 2007/0110159 | A1 | 5/2007 | Wang et al. |
| 2008/0069203 | A1* | 3/2008 | Karczewicz et al. .... 375/240.01 |
| 2008/0089418 | A1 | 4/2008 | Kim et al. |
| 2008/0198934 | A1 | 8/2008 | Hong et al. |
| 2009/0092188 | A1* | 4/2009 | Lee et al. ................. 375/240.16 |
| 2009/0257668 | A1* | 10/2009 | Ye et al. ........................ 382/233 |
| 2010/0074332 | A1* | 3/2010 | Karczewicz et al. .... 375/240.12 |

OTHER PUBLICATIONS

Communication from the International Searching Authority, dated Nov. 9, 2011, issued in counterpart International Application No. PCT/KR2011/002378.

* cited by examiner

*Primary Examiner* — Christopher S Kelley
*Assistant Examiner* — Kaitlin A Retallick
(74) *Attorney, Agent, or Firm* — Sughrue Mion, PLLC

(57) ABSTRACT

Methods and apparatuses for encoding and decoding video are provided. The encoding method includes: performing motion estimation on a current block according to a first sub-pixel unit, and obtaining a motion vector in the first sub-pixel unit with respect to the current block; interpolating a reference picture indicated by the motion vector according to a second sub-pixel unit smaller than the first sub-pixel unit; using the interpolated reference picture, selecting a second sub-pixel in the second sub-pixel unit adjacent to a first sub-pixel in the first sub-pixel unit of the reference picture; selecting a corresponding region that has a smaller error with the current block, from among a first corresponding region of the reference picture and obtained with respect to the first sub-pixel, and a second corresponding region of the current block and obtained with respect to the selected second sub-pixel; and encoding information of the selected corresponding region.

32 Claims, 20 Drawing Sheets

FIG. 7
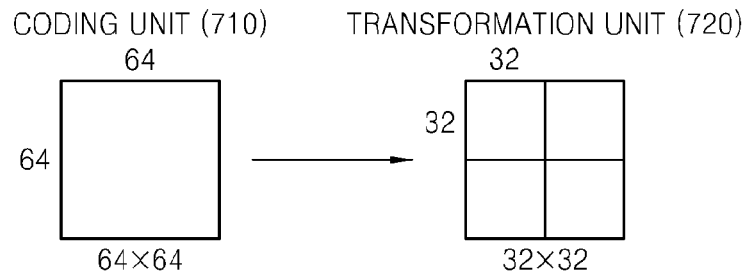
FIG. 8
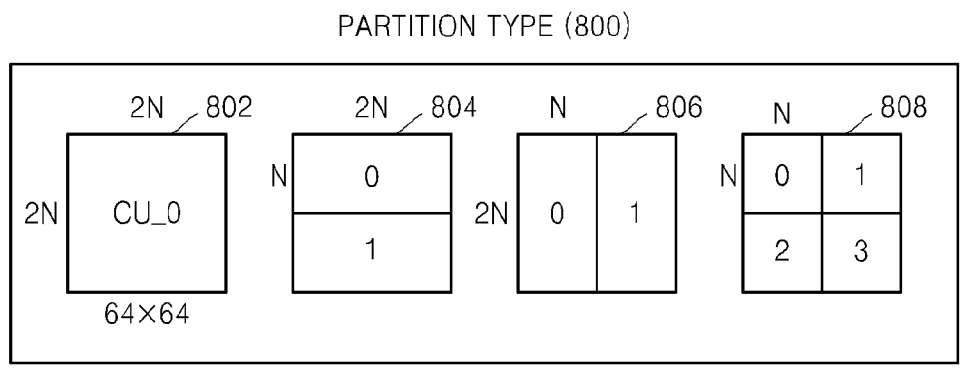
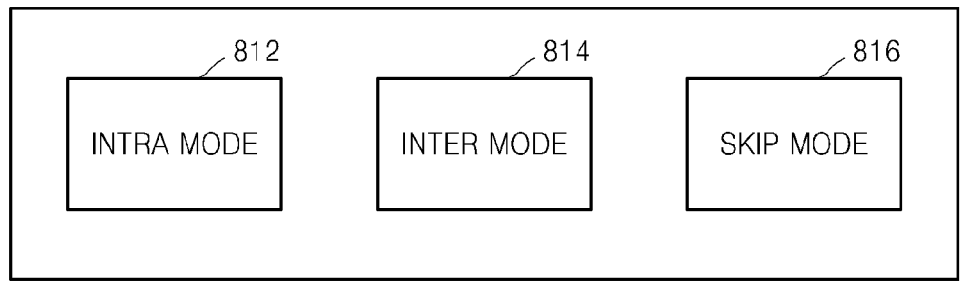
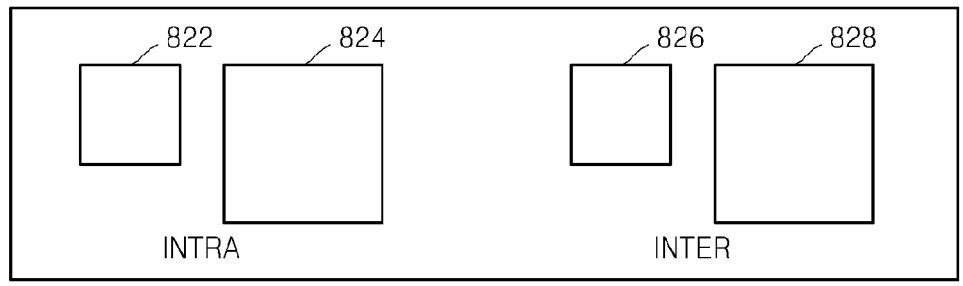

CODING UNITS (1010)

FIG. 18
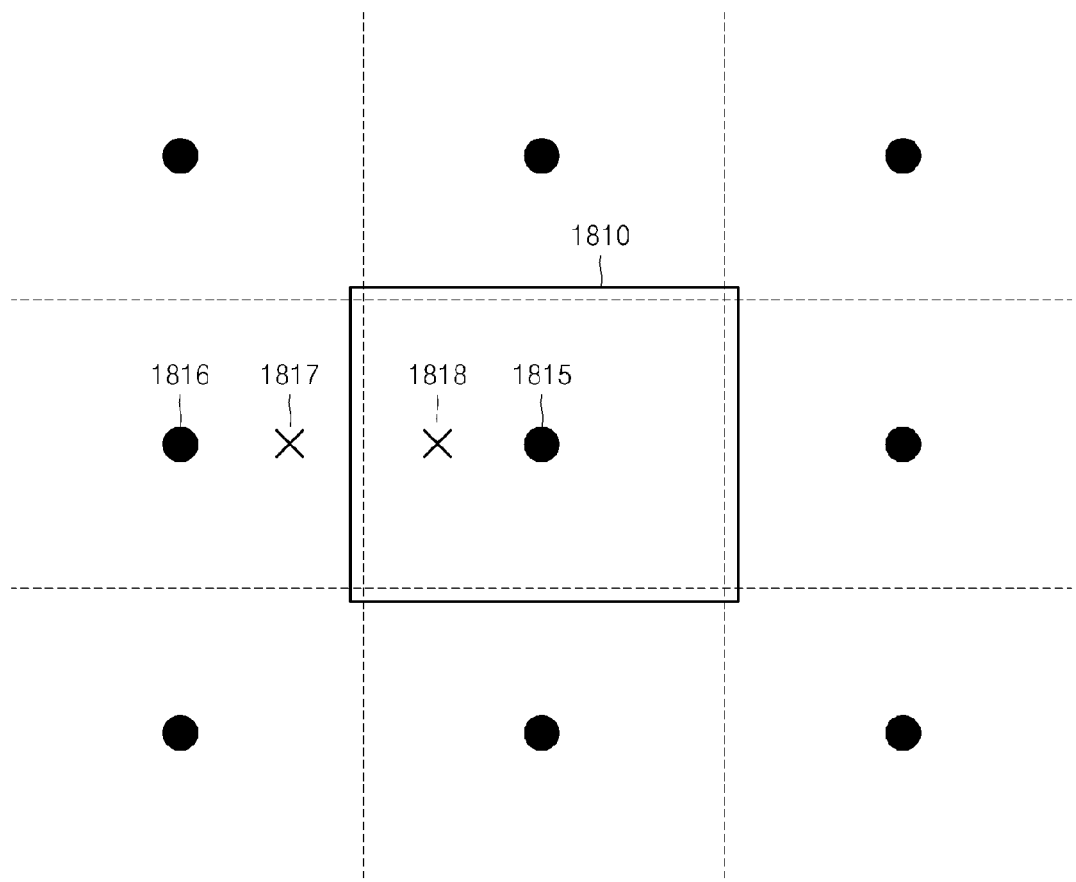
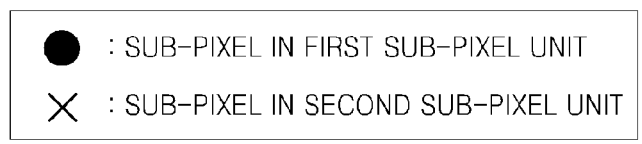
● : SUB-PIXEL IN FIRST SUB-PIXEL UNIT
✕ : SUB-PIXEL IN SECOND SUB-PIXEL UNIT

● : SUB-PIXEL IN FIRST SUB-PIXEL UNIT
○ : SUB-PIXEL IN SECOND SUB-PIXEL UNIT

■ : FIRST SUB-PIXEL
● : SECOND SUB-PIXEL

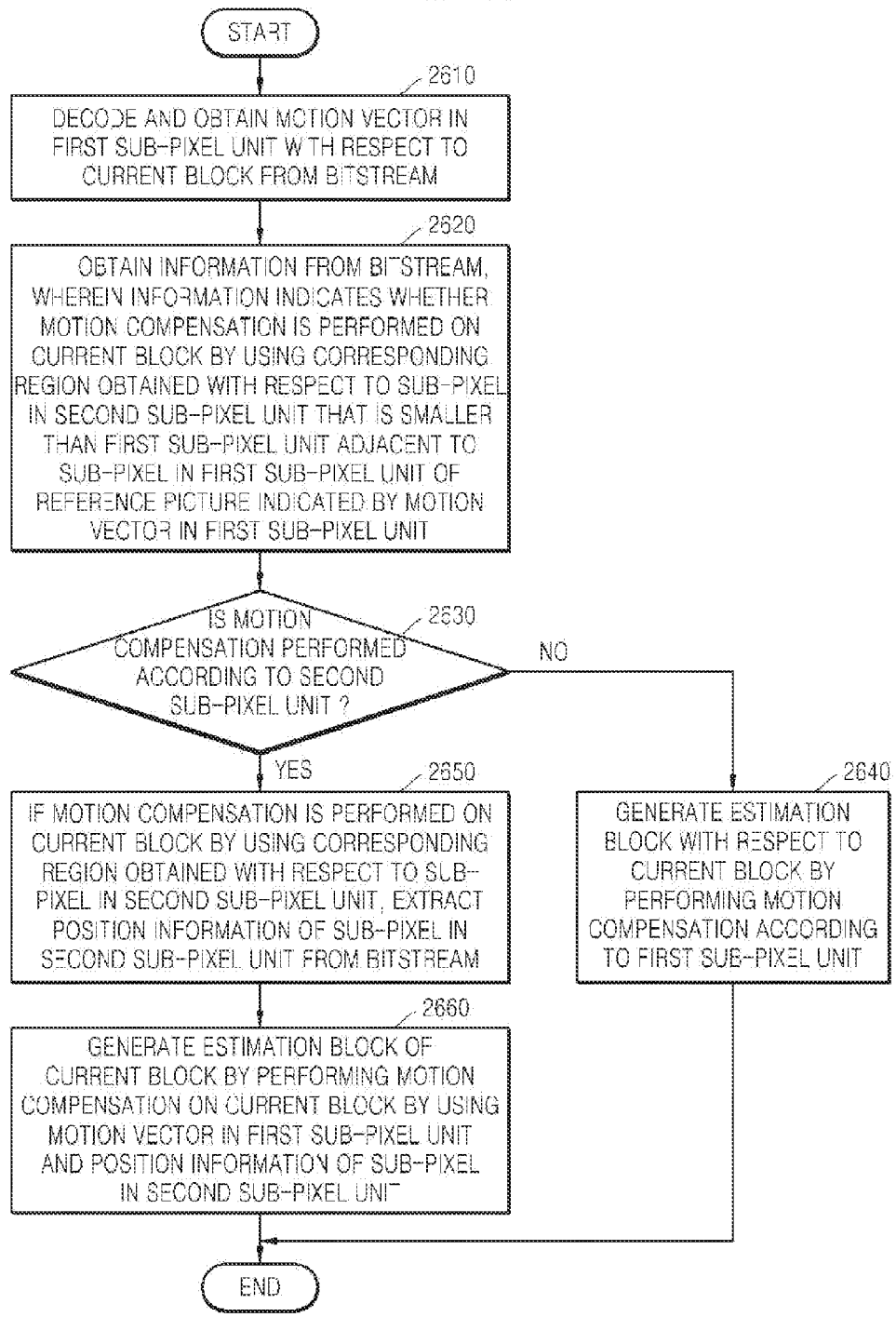

METHOD AND APPARATUS FOR ENCODING AND DECODING VIDEO BASED ON FIRST SUB-PIXEL UNIT AND SECOND SUB-PIXEL UNIT

CROSS-REFERENCE TO RELATED APPLICATIONS

This application claims the benefit of U.S. Provisional Patent Application No. 61/320,837, filed on Apr. 5, 2010, and priority from Korean Patent Application No. 10-2011-0005003, filed on Jan. 18, 2011 in the Korean Intellectual Property Office, the disclosures of which are incorporated herein their entireties by reference.

BACKGROUND

1. Field

Apparatuses and methods consistent with exemplary embodiments relate to encoding and decoding video, and more particularly, to accurate motion estimation and compensation of a video.

2. Description of the Related Art

As hardware for reproducing and storing high resolution or high quality video content is being developed and supplied, a need for a video codec for effectively encoding or decoding the high resolution or high quality video content is increasing. In a related art video codec, video is encoded in units of macroblocks each having a predetermined size according to a limited encoding method.

SUMMARY

Aspects of one or more exemplary embodiments provide a video encoding and decoding method and apparatus which perform accurate motion estimation and compensation without significantly increasing a computation load.

According to an aspect of an exemplary embodiment, there is provided a method of encoding video, the method including: performing motion estimation on a current block according to a first sub-pixel unit, and obtaining a motion vector in the first sub-pixel unit with respect to the current block; interpolating a reference picture indicated by the obtained motion vector in the first sub-pixel unit according to a second sub-pixel unit smaller than the first sub-pixel unit; selecting a second sub-pixel from among sub-pixels in the second sub-pixel units adjacent to a first sub-pixel in the first sub-pixel unit of the reference picture indicated by the motion vector in the first sub-pixel unit, wherein the selecting is performed by using the interpolated reference picture; selecting a corresponding region that has a smaller error with the current block and that is from among a first corresponding region that is of the reference picture indicated by the motion vector and that is obtained with respect to the first sub-pixel in the first sub-pixel unit, and a second corresponding region that is of the current block and that is obtained with respect to the selected second sub-pixel in the second sub-pixel unit; and encoding information of the selected corresponding region.

According to an aspect of another exemplary embodiment, there is provided a video encoding apparatus including: a motion estimator which performs motion estimation on a current block by a first sub-pixel unit, and obtains a motion vector in the first sub-pixel unit with respect to the current block; a motion compensator which interpolates a reference picture indicated by the motion vector in the first sub-pixel unit according to a second sub-pixel unit smaller than the first sub-pixel unit;, which, by using the reference picture interpolated according to the second sub-pixel unit, selects a second sub-pixel from among sub-pixels in the second sub-pixel units adjacent to a first sub-pixel in the first sub-pixel unit of the reference picture indicated by the motion vector in the first sub-pixel unit, and which selects a corresponding region that has a smaller error with the current block and that is from among a first corresponding region that is of the reference picture indicated by the motion vector and that is obtained with respect to the first sub-pixel in the first sub-pixel unit, and a second corresponding region that is of the current block and that is obtained with respect to the selected second sub-pixel in the second sub-pixel unit; and an encoder which encodes information of the selected corresponding region.

According to an aspect of another exemplary embodiment, there is provided a method of decoding video, the method including: decoding and obtaining a motion vector in a first sub-pixel unit with respect to a current block from a bitstream; obtaining information from the bitstream, wherein the information indicates whether motion compensation is performed on the current block by using a corresponding region obtained with respect to a second sub-pixel in a second sub-pixel unit that is smaller than the first sub-pixel unit adjacent to a first sub-pixel in the first sub-pixel unit of a reference picture indicated by the motion vector in the first sub-pixel unit; if the motion estimation is performed on the current block by using information of the corresponding region obtained with respect to the second sub-pixel in the second sub-pixel unit, extracting position information of the second sub-pixel in the second sub-pixel unit from the bitstream; and performing the motion compensation on the current block by using the motion vector in the first sub-pixel unit, and the extracted position information of the second sub-pixel in the second sub-pixel unit.

According to an aspect of another exemplary embodiment, there is provided a video decoding apparatus including: an entropy decoder which decodes and obtains a motion vector in a first sub-pixel unit with respect to a current block from a bitstream, which obtains information indicating whether motion compensation is performed on the current block by using a corresponding region obtained with respect to a second sub-pixel in a second sub-pixel unit that is smaller than the first sub-pixel unit adjacent to a first sub-pixel in the first sub-pixel unit of a reference picture indicated by the motion vector in the first sub-pixel unit, and which, if the motion estimation is performed on the current block by using information of the corresponding region obtained with respect to the second sub-pixel in the second sub-pixel unit, extracts position information of the second sub-pixel in the second sub-pixel unit from the bitstream; and a motion compensator which performs the motion compensation on the current block by using the motion vector in the first sub-pixel unit, and the extracted position information of the second sub-pixel in the second sub-pixel unit.

BRIEF DESCRIPTION OF THE DRAWINGS

The above and other features and advantages will become more apparent by describing in detail exemplary embodiments with reference to the attached drawings in which:

FIG. 7 is a diagram for describing a relationship between a coding unit and transformation units, according to an exemplary embodiment;

FIG. 8 is a diagram for describing encoding information of coding units corresponding to a coded depth, according to an exemplary embodiment;

FIG. 18 is a reference picture describing an interpolation method performed by an interpolating unit 1710 of FIG. 17;

FIG. 26 is a flowchart illustrating a method of decoding video according to an exemplary embodiment.

DETAILED DESCRIPTION OF EXEMPLARY EMBODIMENTS

Hereinafter, exemplary embodiments will be described in detail with reference to the attached drawings.

Figure 1:
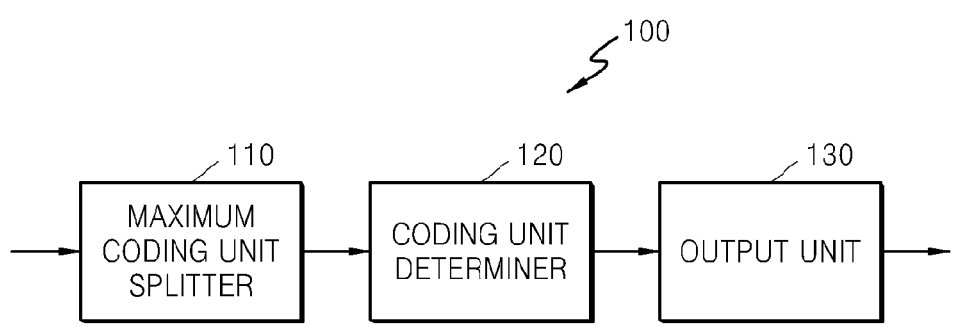
FIG. 1 is a block diagram of a video encoding apparatus, according to an exemplary embodiment.

FIG. 1 is a block diagram of a video encoding apparatus 100, according to an exemplary embodiment. The video encoding apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and a length that are each a multiple of 2 and greater than 8. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

The maximum depth denotes a number of times image data is split from the maximum coding unit to the minimum coding unit. A first maximum depth according to an exemplary embodiment may denote a total number of splitting times from the maximum coding unit to the minimum coding unit. A second maximum depth according to an exemplary embodiment may denote a total number of layers of depths levels from the maximum coding unit to the minimum coding unit. For example, when a depth of the maximum coding unit is 0, a depth of coding units obtained by splitting the maximum coding unit once may be set as 1, and a depth of coding units obtained by splitting the maximum coding unit twice may be set as 2. In this case, if a minimum coding unit denotes coding units obtained by splitting the maximum coding unit four times, since a depth level includes a depth of 0, 1, 2, 3, and 4, the first maximum depth may be set as 4 and the second maximum depth may be set as 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transformation unit'. Similarly to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is also 2N×2N, may be 1 when the size of the transformation unit is N×N, and may be 2 when the size of the transformation unit is N/2×N/2. That is, the transformation unit may also be set based on a tree structure, according to a transformation depth.

Encoding information according to coding units corresponding to a coded depth uses not only information about the coded depth, but also information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a partition, according to exemplary embodiments, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or groups of pictures (GOPs), and information about a maximum depth may be inserted into a Sequence Parameter Set (SPS) or a header of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a related art macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
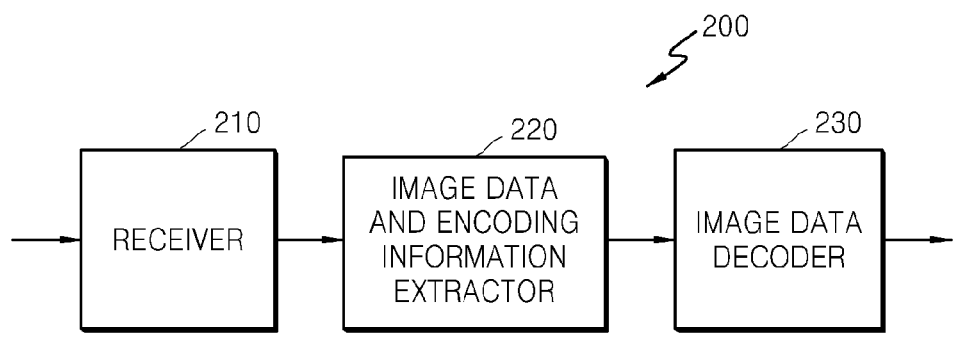
FIG. 2 is a block diagram of a video decoding apparatus, according to an exemplary embodiment.

FIG. 2 is a block diagram of a video decoding apparatus 200, according to an exemplary embodiment. The video decoding apparatus 200 includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture or an SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation. Inverse transformation may be performed according to method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an exemplary embodiment, will now be described with reference to FIGS. 3 through 13.

Figure 3:
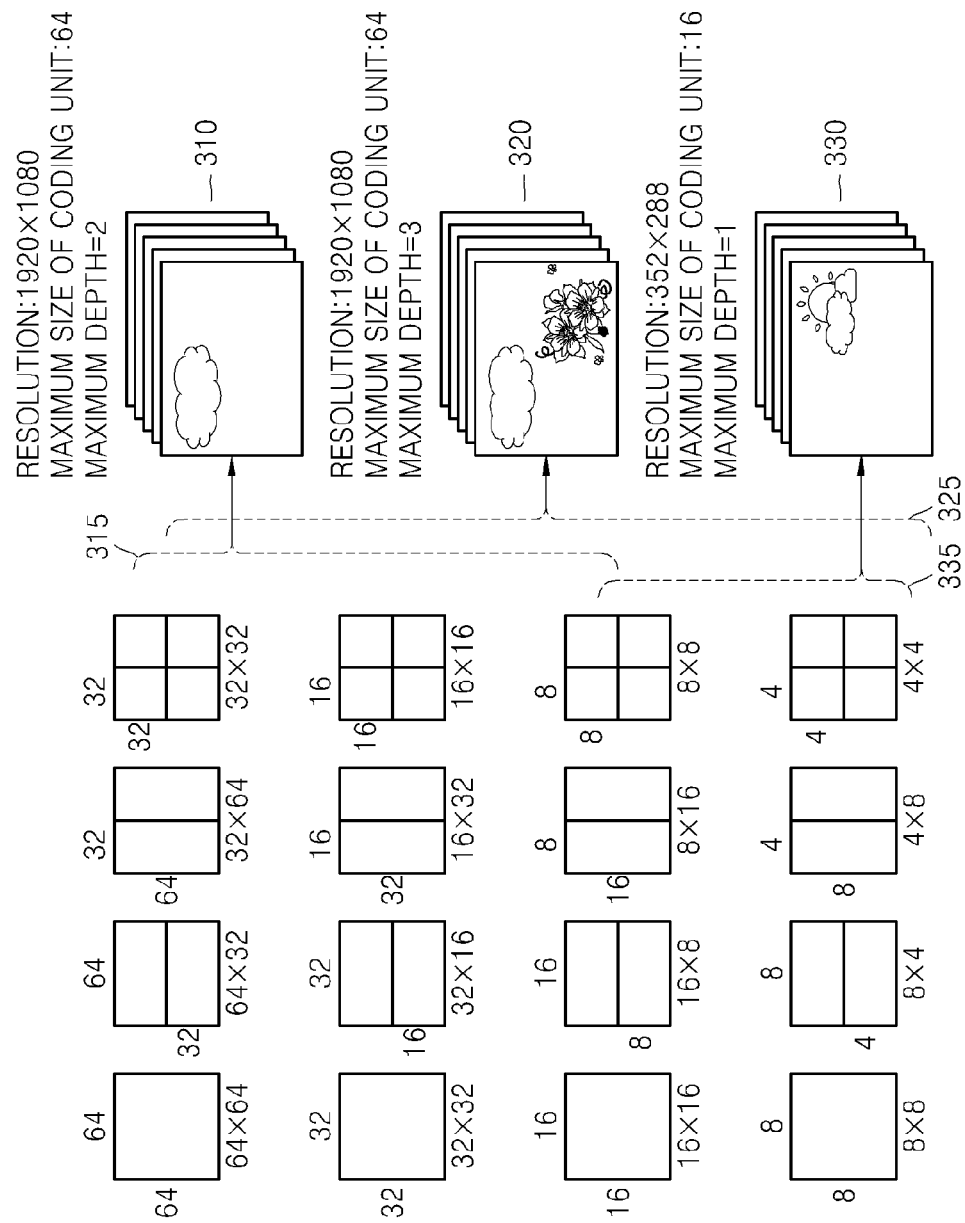
FIG. 3 is a diagram for describing a concept of coding units according to an exemplary embodiment.

FIG. 3 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency, but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be accurately expressed.

Figure 4:
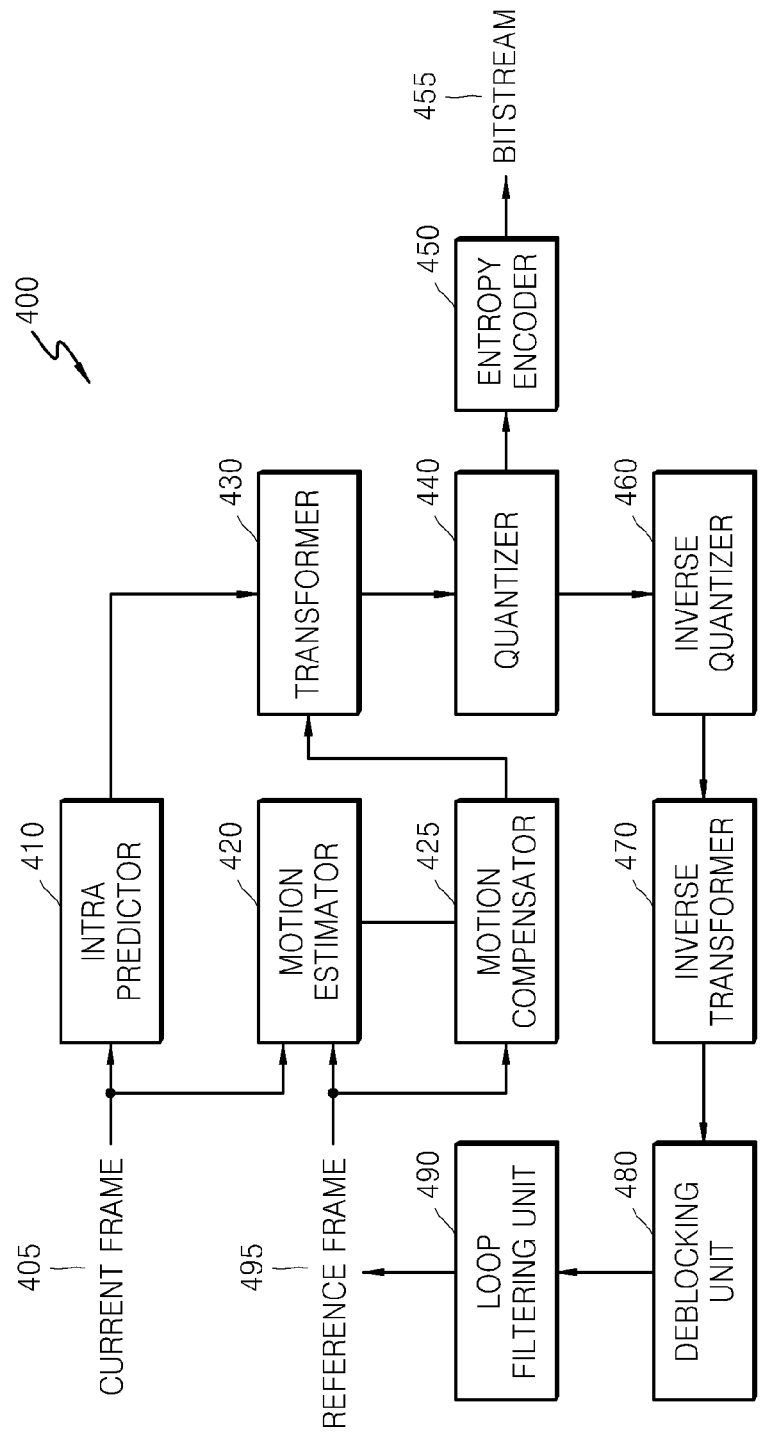
FIG. 4 is a block diagram of an image encoder based on coding units according to an exemplary embodiment.

FIG. 4 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
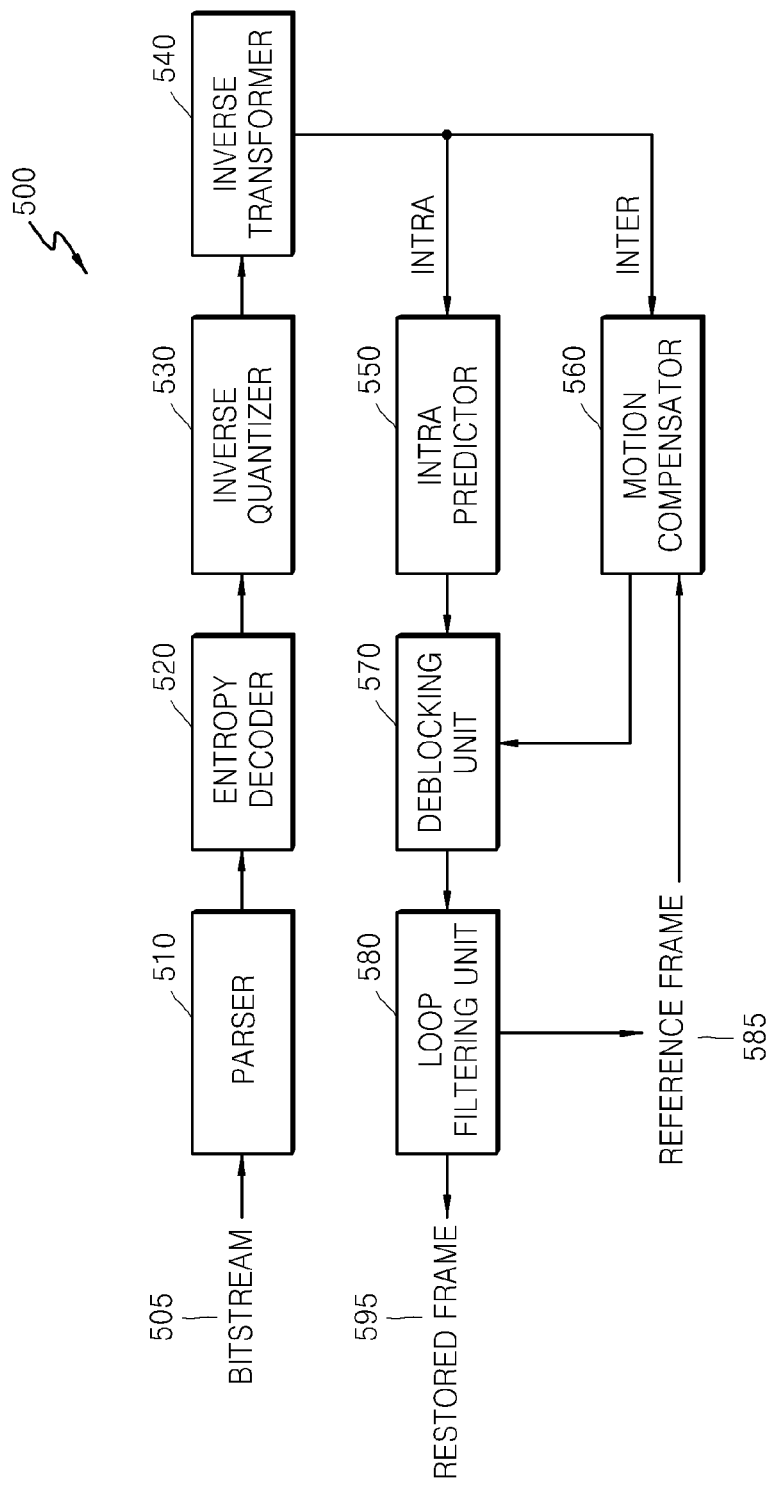
FIG. 5 is a block diagram of an image decoder based on coding units according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

Figure 6:
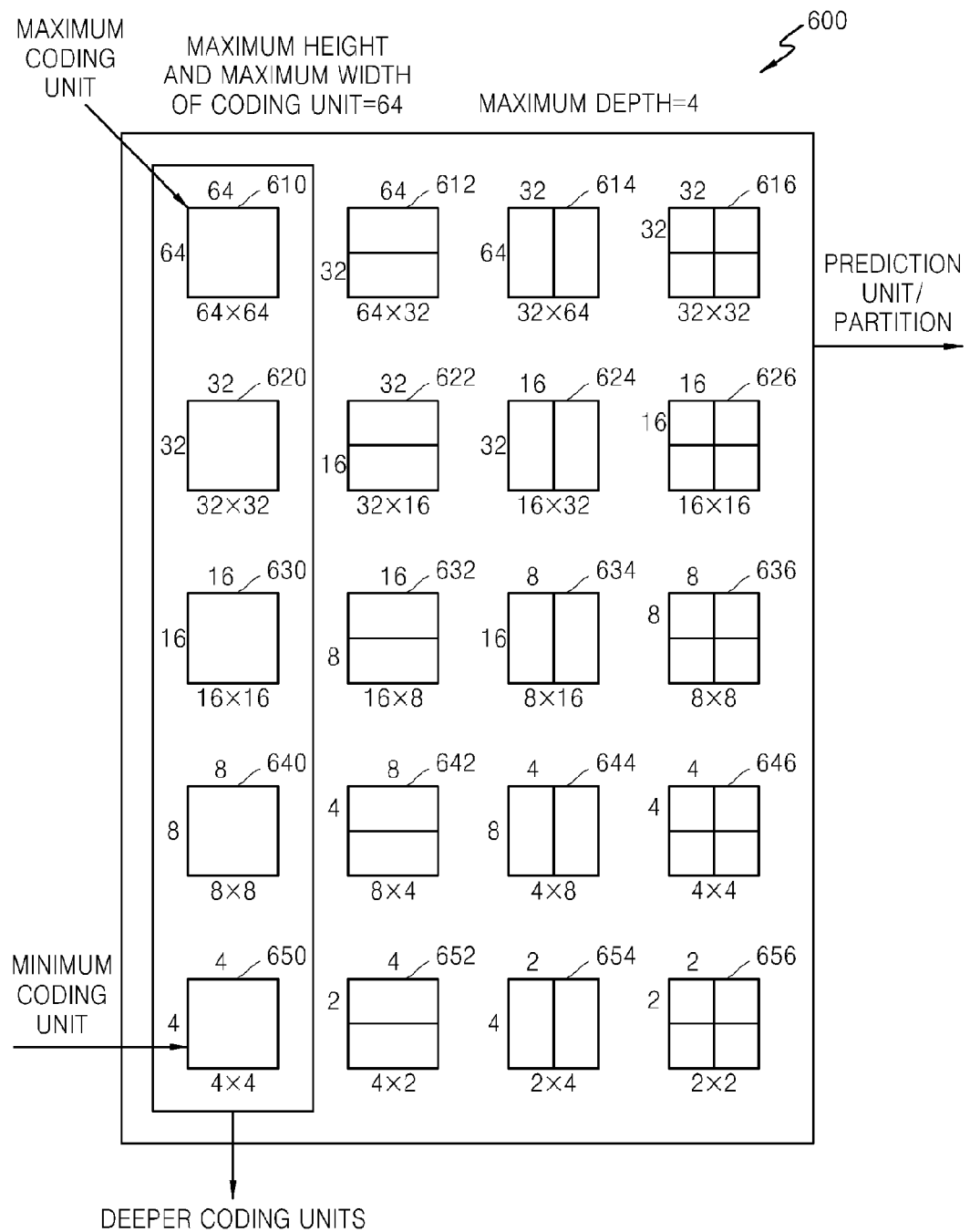
FIG. 6 is a diagram illustrating deeper coding units according to depths, and partitions according to an exemplary embodiment.

FIG. 6 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e., a partition having a size of 8×8 included in the coding unit 640, partitions 642 having a size of 8×4, partitions 644 having a size of 4×8, and partitions 646 having a size of 4×4.

The coding unit 650 having the size of 4×4and the depth of 4 is the minimum coding unit and a coding unit of the lowermost depth. A prediction unit of the minimum coding unit 650 may be a prediction unit 650 whose size is 4×4, a prediction unit 652 having a size of 4×2, a prediction unit 654 having a size of 2×4, or a prediction unit 656 having a size of 2×2.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 7 is a diagram for describing a relationship between a coding unit 710 and transformation units 720, according to an exemplary embodiment.

The video encoding apparatus 100 or video decoding apparatus 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 8 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 may extract and use the information 800, 810, and 820 for decoding, according to each deeper coding unit.

Figure 9:
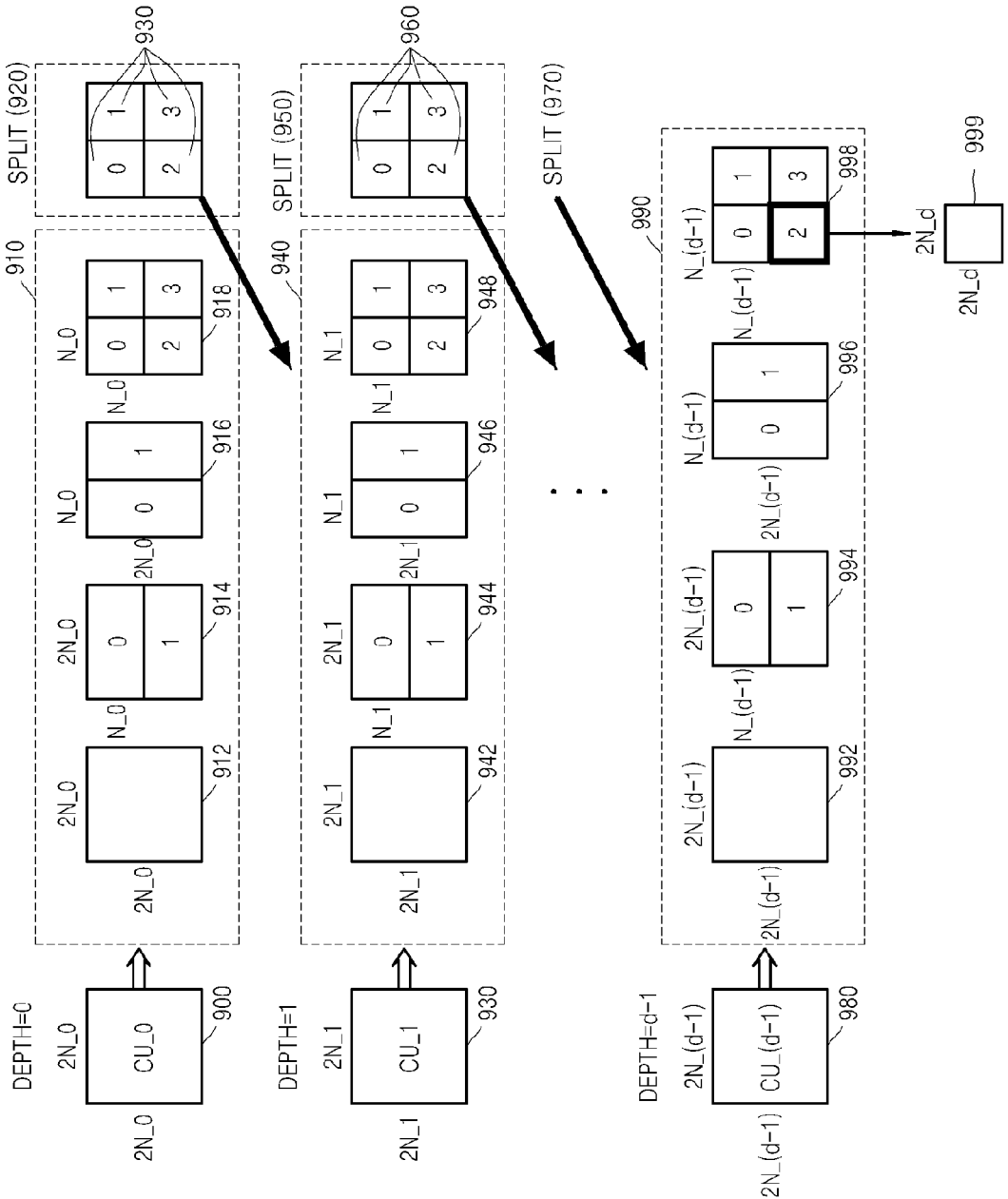
FIG. 9 is a diagram of deeper coding units according to depths, according to an exemplary embodiment.

FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, a split operation according to each depth may be performed up to when a depth becomes d-1, and split information may be encoded as up to when a depth is one of 0 to d-2. In other words, when encoding is performed up to when the depth is d-1 after a coding unit corresponding to a depth of d-2 is split in operation 970, a prediction unit 990 for prediction encoding a coding unit 980 having a depth of d-1 and a size of 2N_(d-1)×2N_(d-1) may include partitions of a partition type 992 having a size of 2N_(d-1)×2N_(d-1), a partition type 994 having a size of 2N_(d-1)×N_(d-1), a partition type 996 having a size of N_(d-1)×2N_(d-1), and a partition type 998 having a size of N_(d-1)×N_(d-1).

Prediction encoding may be repeatedly performed on one partition having a size of 2N_(d-1)×2N_(d-1), two partitions having a size of 2N_(d-1)×N_(d-1), two partitions having a size of N_(d-1)×2N_(d-1), four partitions having a size of N_(d-1)×N_(d-1) from among the partition types 992 through 998 to search for a partition type having a minimum encoding error.

Even when the partition type 998 has the minimum encoding error, since a maximum depth is d, a coding unit CU_(d-1) having a depth of d-1 is no longer split to a lower depth, and a coded depth for the coding units constituting a current maximum coding unit 900 is determined to be d-1 and a partition type of the current maximum coding unit 900 may be determined to be N_(d-1)×N_(d-1). Also, since the maximum depth is d and a minimum coding unit 980 having a lowermost depth of d-1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
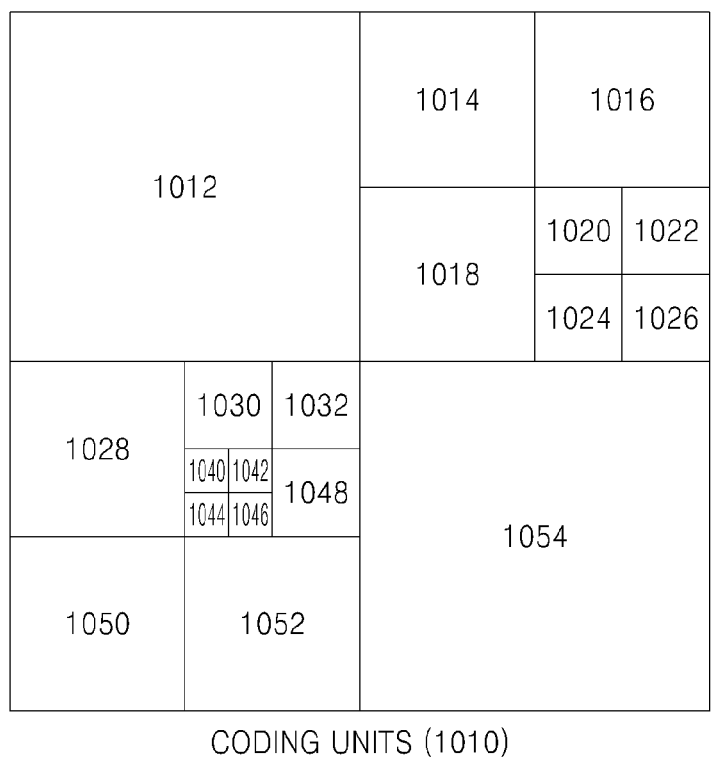
FIGS. 10 through 12 are diagrams for describing a relationship between coding units, prediction units, and transformation units, according to an exemplary embodiment.
Figure 11:
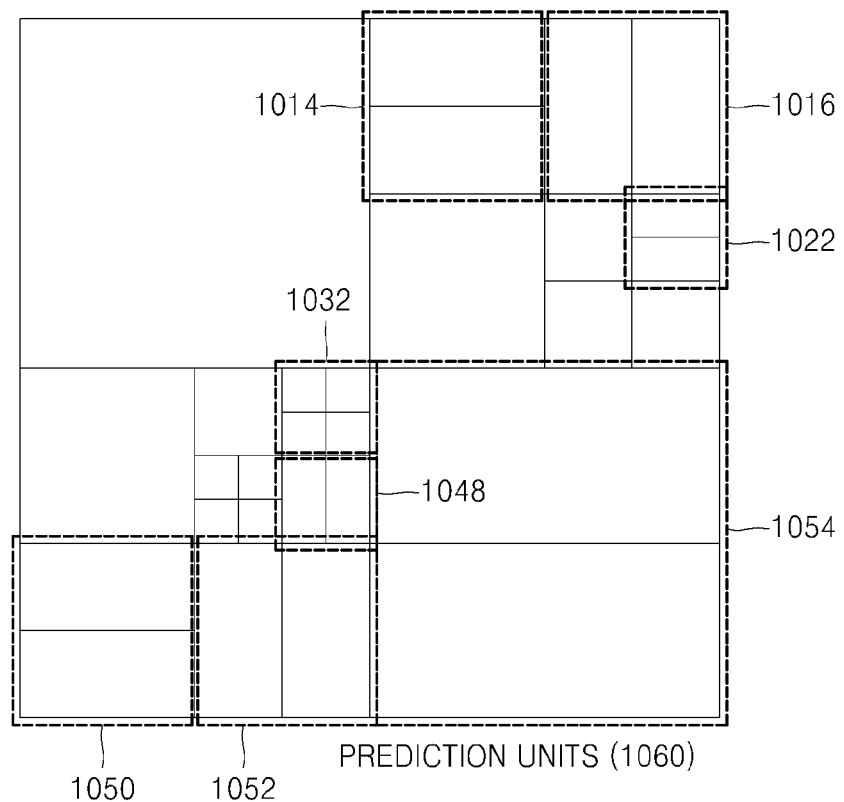
Figure 12:
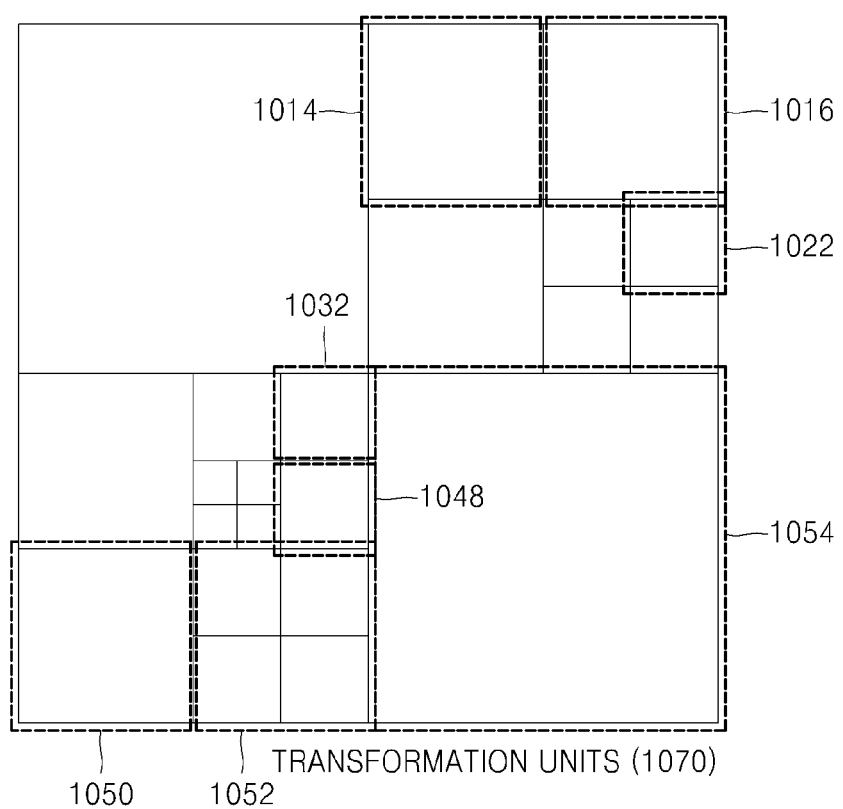

FIGS. 10 through 12 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| Split Information 0 (Encoding on Coding Unit having Size of 2N×2N and Current Depth of d) | | | | | Split Information 1 |
|---|---|---|---|---|---|
| Prediction Mode | Partition Type | | Size of Transformation Unit | | |
| Intra Inter Skip (Only 2N×2N) | Symmetrical Partition Type 2N×2N 2N×N N×2N N×N | Asymmetrical Partition Type 2N×nU 2N×nD nL×2N nR×2N | Split Information 0 of Transformation Unit 2N×2N | Split Information 1 of Transformation Unit N×N (Symmetrical Type) N/2×N/2 (Asymmetrical Type) | Repeatedly Encode Coding Units having Lower Depth of d + 1 |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, a prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL'2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoding information of the data units, and the searched adjacent coding units may be referred to for predicting the current coding unit.

Figure 13:
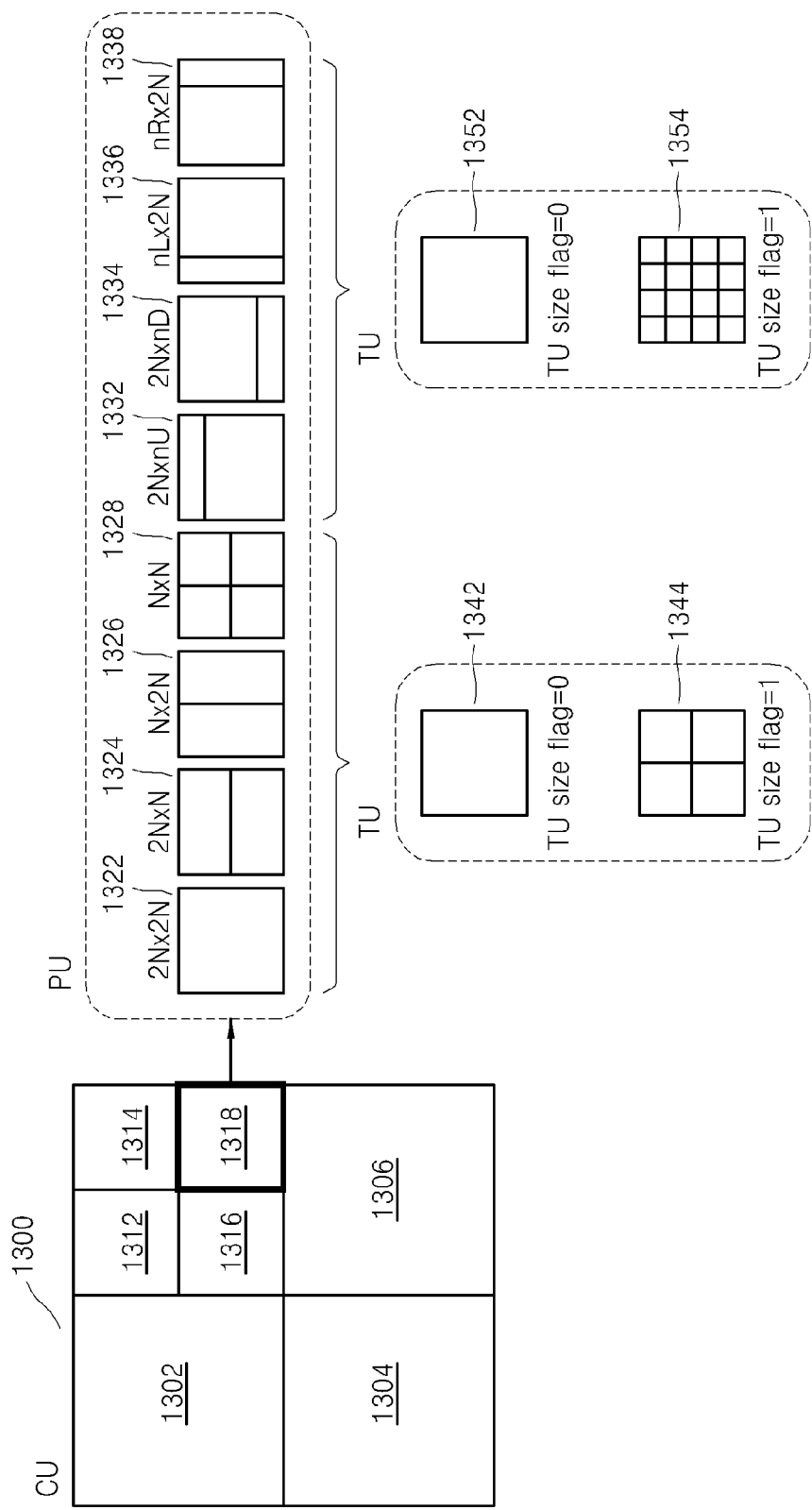
FIG. 13 is a diagram for describing a relationship between a coding unit, a prediction unit or a partition, and a transformation unit, according to encoding mode information of Table 1.

FIG. 13 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e., the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Hereinafter, motion estimation and compensation performed by the motion estimator 420 and the motion compensator 425 of the video encoding apparatus 100 illustrated in FIG. 4 and the intra predictor 550 of the video decoding apparatus 200 illustrated in FIG. 5 will be described in detail. In the following description, the aforementioned prediction unit is referred to as a block.

Figure 14:
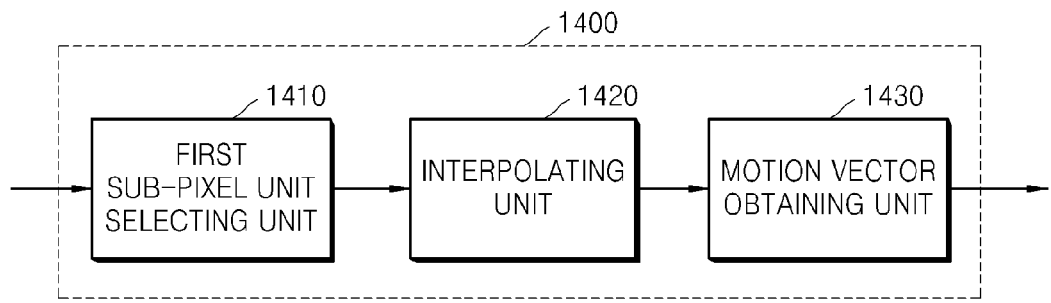
FIG. 14 is a block diagram illustrating a configuration of a motion estimating device according to an exemplary embodiment.

FIG. 14 is a block diagram illustrating a configuration of a motion estimating device 1400 according to an exemplary embodiment. The motion estimating device 1400 of FIG. 14 corresponds to the motion estimator 420 of FIG. 4.

Referring to FIG. 14, the motion estimating device 1400 includes a first sub-pixel unit selecting unit 1410, an interpolating unit 1420, and a motion vector obtaining unit 1430.

The first sub-pixel unit selecting unit 1410 determines a pixel accuracy from at least two pixel accuracies and that is to be applied to motion estimation of a current block. For example, the first sub-pixel unit selecting unit 1410 determines which pixel accuracy among a 1/4 sub-pixel unit and a 1/8 sub-pixel unit is used in performing motion estimation. The first sub-pixel unit selecting unit 1410 is not an essential configuring element and thus may be omitted in a case where a pixel accuracy to be used in motion estimation is previously set in an encoder and a decoder. If the first sub-pixel unit selecting unit 1410 selects a first sub-pixel unit among a plurality of accuracies, information about the selected first sub-pixel unit is encoded and then transmitted to the decoder.

If the first sub-pixel unit is equal to or less than an integer pixel, the interpolating unit 1420 interpolates pixel values of a reference picture and generates a reference picture that is interpolated according to the first sub-pixel unit.

Figure 15:
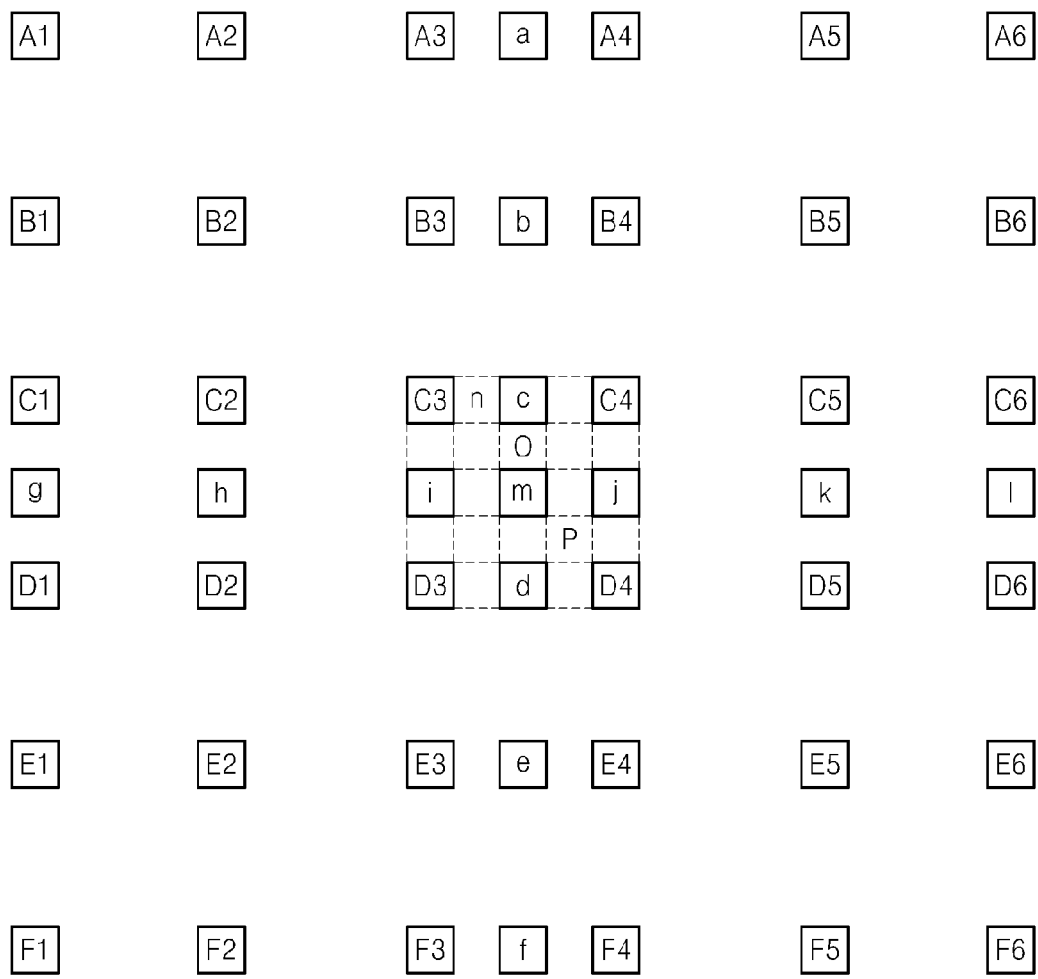
FIG. 15 illustrates an interpolation method performed by an interpolating unit 1420 of FIG. 14.

FIG. 15 illustrates an interpolation method performed by the interpolating unit 1420 of FIG. 14.

Referring to FIG. 15, the interpolating unit 1420 generates sub-pixels in the first sub-pixel units by interpolating integer pixels A1~A6, B1~B6, C1~C6, D1~D6, E1~E6, and F1~F6 of a reference picture. For example, if the first sub-pixel unit is a 1/2 sub-pixel, the interpolating unit 1420 generates sub-pixels a through 1 in the 1/2 sub-pixel units by performing interpolation by using a 6-tab Finite Impulse Response (FIR)

filter. Here, coefficients of the 6-tab FIR filter may be [(1, −5, 20, 20, −5, 1)/32]. A 1/2 sub-pixel a between the integer pixels A3 and A4 is generated by performing interpolation by using the integer pixels A1, A2, A3, A4, A5, and A6, and a 1/2 sub-pixel b between the integer pixels B3 and B4 is generated by performing interpolation by using the integer pixels B1, B2, B3, B4, B5 and B6. In a case where the 6-tab FIR filter having the coefficients is used, interpolated pixel values of the 1/2 sub-pixels a and b may be calculated as a=(A1−5×A2+20×A3+20×A4−5×A5+A6)/32, and b=(B1−5×B2+20×B3+20×B4−5×B5+B6)/32. Similarly, the interpolating unit 1420 generates sub-pixels c, d, e, and f in the 1/2 sub-pixel units. Similarly, sub-pixels in a vertical direction are generated by performing interpolation by using the 6-tab FIR filter. The interpolating unit 1420 generates a 1/2 sub-pixel g by using the integer pixels A1, B1, C1, D1, E1 and F1, and generates a 1/2 sub-pixel h by using the integer pixels A2, B2, C2, D2, E2 and F2.

A sub-pixel m in the 1/2 sub-pixel unit is interpolated by using other sub-pixels in the 1/2 sub-pixel units. A pixel value of the sub-pixel m in the 1/2 sub-pixel unit is calculated as m=(a−5×b+20×c+20×d−5×e+f)/32. When the sub-pixels in the 1/2 sub-pixel units are generated, it is possible to generate sub-pixels in 1/4 sub-pixel units by performing linear interpolation by using pixels in the integer pixel units and the sub-pixels in the 1/2 sub-pixel units. For example, the sub-pixel n in the 1/4 sub-pixel unit is generated by performing the linear interpolation by using the pixel C3 in the integer pixel unit and the sub-pixel c in the 1/2 sub-pixel unit. For example, a pixel value of the sub-pixel n in the 1/4 sub-pixel unit may be calculated as n=(C3+c)/2. Also, a pixel value of another sub-pixel o in the 1/4 sub-pixel unit is generated by performing the linear interpolation by using the sub-pixels c and m in the 1/2 sub-pixel unit. For example, a pixel value of the sub-pixel o in the 1/4 sub-pixel unit may be calculated as o=(c+m)/2. A sub-pixel p in the 1/4 sub-pixel unit in a diagonal direction is generated by performing the linear interpolation by using 1/2 sub-pixels in a diagonal direction. For example, a pixel value of the sub-pixel p in the 1/4 sub-pixel unit may be calculated as p=(d+j)/2. However, a method of interpolating the sub-pixels equal to or less than the integer pixels is not limited to the aforementioned examples and thus the sub-pixels equal to or less than the integer pixels may be interpolated in various ways.

As illustrated in FIG. 15, the interpolating unit 1420 performs the interpolation on the reference picture according to the first sub-pixel unit. That is, in a case where the first sub-pixel unit is the 1/2 sub-pixel unit, the interpolating unit 1420 interpolates the reference picture according to the 1/2 sub-pixel unit, and in a case where the first sub-pixel unit is the 1/4 sub-pixel unit, the interpolating unit 1420 interpolates the reference picture according to the 1/4 sub-pixel unit.

Referring back to FIG. 14, the motion vector obtaining unit 1430 obtains a motion vector of a current block by comparing the current block with the reference picture interpolated according to the 1/2 sub-pixel unit.

Figure 16:
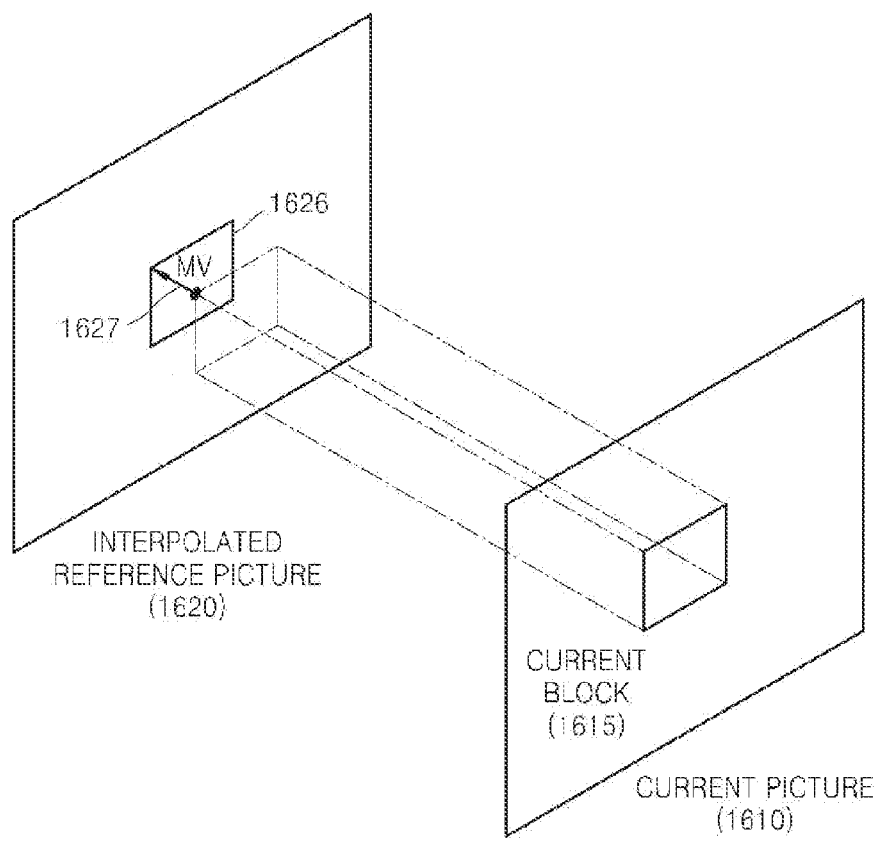
FIG. 16 is a diagram describing motion estimation performed by a motion vector obtaining unit 1430 of FIG. 14.

FIG. 16 is a diagram describing motion estimation performed by the motion vector obtaining unit 1430 of FIG. 14. The motion vector obtaining unit 1430 searches a corresponding region 1626 having the greatest similarity with a current block 1615 in a reference picture 1620 that is interpolated according to a first sub-pixel unit, and outputs a positional difference as a motion vector MV 1627 which is between the corresponding region 1626 and the current block 1615. The motion vector obtaining unit 1430 determines the corresponding region 1626 having the greatest similarity by calculating a difference value between the current block 1615 and the corresponding region 1626 in the reference picture 1620, e.g., by calculating an error value such as a Sum of Absolute Difference (SAD). The motion vector MV 1627 obtained by the motion vector obtaining unit 1430 has an accuracy of the aforementioned first sub-pixel unit. For example, in a case where the first sub-pixel unit is a 1/4 sub-pixel unit, the motion vector MV also has an accuracy of the 1/4 sub-pixel unit.

Figure 17:
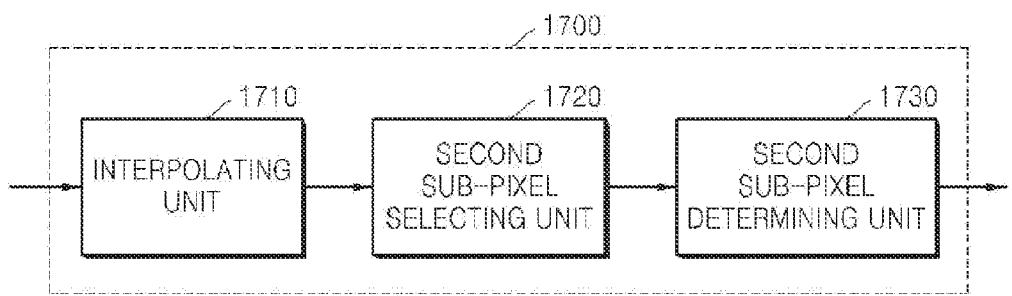
FIG. 17 is a block diagram illustrating a configuration of a motion compensating device according to an exemplary embodiment.

FIG. 17 is a block diagram illustrating a configuration of a motion compensating device 1700 according to an exemplary embodiment. The motion compensating device 1700 of FIG. 17 corresponds to the motion compensator 425 of FIG. 4.

When a motion vector in a first sub-pixel unit is obtained by using the motion estimating device 1400, in order to allow further accurate motion estimation, the motion compensating device 1700 performs motion compensation by correcting the motion vector in the first sub-pixel unit by using a second sub-pixel unit that is smaller than the first sub-pixel unit.

Referring to FIG. 17, the motion compensating device 1700 includes an interpolating unit 1710, a second sub-pixel selecting unit 1720, and a second sub-pixel determining unit 1730.

The interpolating unit 1710 interpolates a reference picture according to the second sub-pixel unit that is smaller than the first sub-pixel unit, wherein the reference picture is indicated by the motion vector in the first sub-pixel unit.

FIG. 18 is a reference picture describing an interpolation method performed by the interpolating unit 1710 of FIG. 17.

Referring to FIG. 18, when it is assumed that a sub-pixel 1815 of FIG. 18 is a first sub-pixel of the reference picture indicated by the motion vector in the first sub-pixel unit, which is obtained by using the motion estimating device 1400, the motion vector in the first sub-pixel unit may be corrected in a region 1810 that does not overlap with other sub-pixels in the first sub-pixel units. This is because, when the first sub-pixel unit has an accuracy of an x value (where x is an actual number), an error tolerance has a value of ±x/2. The motion vector in the first sub-pixel unit may be corrected in the region 1810 that does not overlap with the other sub-pixels in the first sub-pixel units. Thus, the motion compensating device 1700 according to the present exemplary embodiment performs motion estimation by correcting the motion vector in the region 1810 with respect to a sub-pixel in the first sub-pixel unit indicated by the motion vector in the first sub-pixel unit which is obtained by performing motion estimation according to the first sub-pixel unit.

The interpolating unit 1710 interpolates the reference picture according to a second sub-pixel unit that is smaller than the first sub-pixel unit, and in this regard, the second sub-pixel unit may be obtained by partitioning the first sub-pixel unit according to an odd number. In general, motion estimation is performed according to the first sub-pixel unit having a value of $1/(2^p)$ (where p is an integer equal to or greater than 0), and thus, when the second sub-pixel unit is a $1/(2^q)$ sub-pixel unit (where q is an integer greater than p), the motion estimation is similar to a process for obtaining a motion vector. Accordingly, when the first sub-pixel unit is $1/(2^p)$ (where p is an integer equal to or greater than 0), the second sub-pixel unit may be a $1/[(2a+1)*(2^p)]$ sub-pixel unit (where a is an integer equal to or greater than 1).

For example, if the first sub-pixel unit is a 1/4 sub-pixel unit, the second sub-pixel unit may be a 1/12 sub-pixel unit that is obtained by trisecting a gap between 1/4 sub-pixel units. In FIG. 18, when the first sub-pixel unit is the 1/4 sub-pixel unit, and the second sub-pixel unit is the 1/12 sub-pixel unit, the interpolating unit 1710 generates values of sub-pixels by using various filters, wherein the sub-pixels are at positions corresponding to a trisection of the gap between 1/4 sub-pixel units. For example, sub-pixels 1817 and 1818 in 1/12 sub-pixel units at positions corresponding to a trisection of a gap between 1/4 sub-pixels 1815 and 1816 may be calculated by using a weighted average value in consideration of a distance to the 1/4 sub-pixel 1815 and 1816. That is, in a case where a value of the 1/4 sub-pixel 1815 is f, a value of the 1/4 sub-pixel 1816 is g, a value of the 1/12 sub-pixel 1817 is h, and a value of the 1/12 sub-pixel 1818 is i, the sub-pixels 1817 and 1818 may be calculated as h=[f+2g]/3, and i=[2f+g]/3. However, it is understood to one of ordinary skill in the art that an interpolation process for generating the pixel values at the positions of the sub-pixels is not limited to the aforementioned examples and thus the pixel values may be generated in various ways.

Referring back to FIG. 17, when the interpolating unit 1710 interpolates the reference picture according to the second sub-pixel unit, the second sub-pixel selecting unit 1720 selects one sub-pixel among sub-pixels in the second sub-pixel units that are adjacent to a sub-pixel in the first sub-pixel unit of the reference picture indicated by the motion vector in the first sub-pixel unit.

Figure 19:
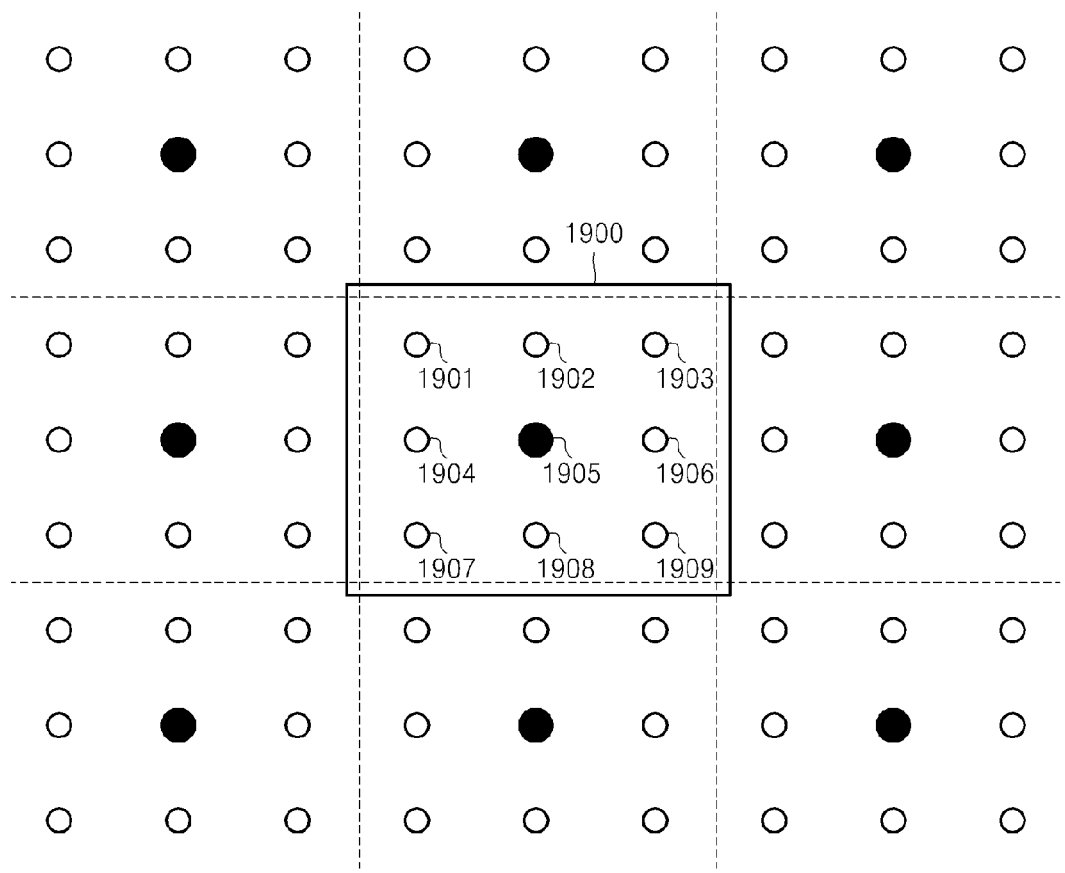
FIG. 19 is a diagram for describing second sub-pixel selection performed by a second sub-pixel selecting unit 1720 of FIG. 17.
Figure 20:
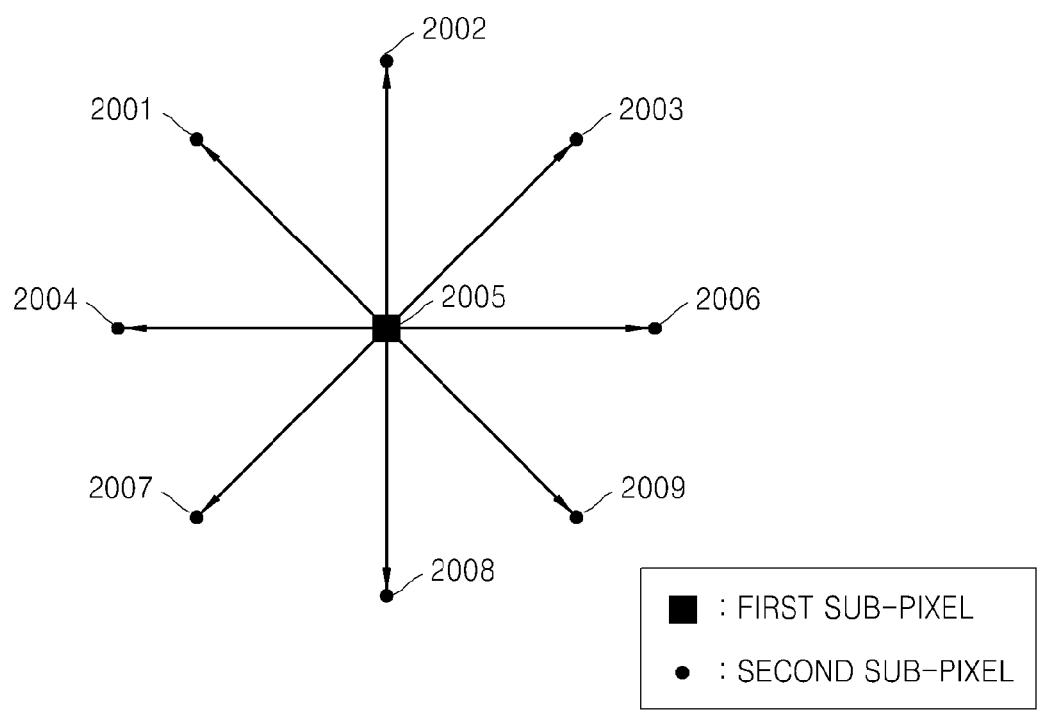
FIG. 20 is a reference diagram illustrating correction directions of a motion vector according to the second sub-pixel selection of FIG. 19.

FIG. 19 is a diagram for describing second sub-pixel selection performed by the second sub-pixel selecting unit 1720 of FIG. 17. FIG. 20 is a reference diagram illustrating correction directions of a motion vector according to the second sub-pixel selection of FIG. 19.

Referring to FIGS. 19 and 20, the second sub-pixel selecting unit 1720 selects and outputs one of adjacent second sub-pixels 1901 through 1909 positioned in a predetermined region 1900 of a sub-pixel 1905 in a first sub-pixel unit of a reference picture indicated by a motion vector in the first sub-pixel unit, wherein the predetermined region 1900 does not overlap with other first sub-pixel units. The adjacent second sub-pixels 1901 through 1909 selected by the second sub-pixel selecting unit 1720 are used to correct the motion vector in the first sub-pixel unit. That is, as illustrated in FIG. 20, according to which one is selected from among second sub-pixels 2001 through 2009, the motion vector in the first sub-pixel unit is corrected by a vector corresponding to a difference between the motion vector and the selected second sub-pixel from among the second sub-pixels 2001 through 2009.

Figure 21:
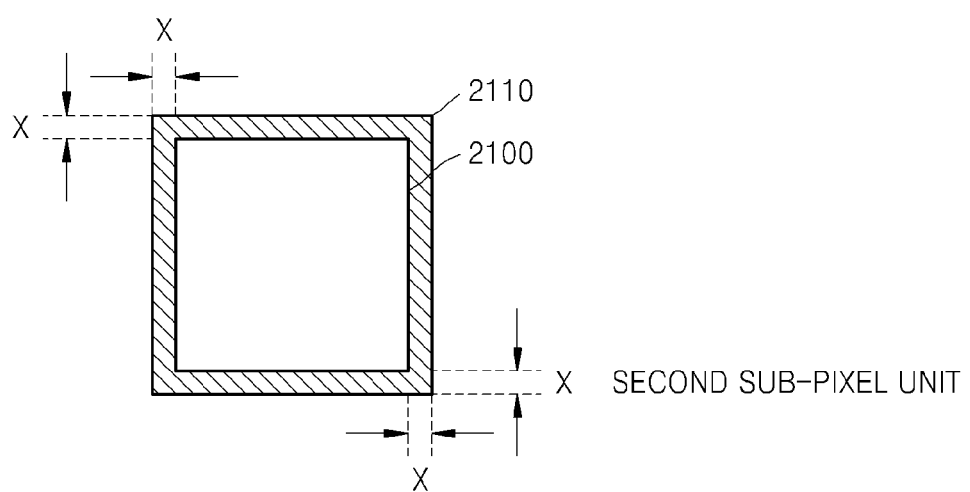
FIG. 21 illustrates a corresponding region of a reference picture to be corrected by motion estimation and compensation according to an exemplary embodiment.

FIG. 21 illustrates a corresponding region 2100 of a reference picture to be corrected by motion estimation and compensation according to an exemplary embodiment.

Referring to FIG. 21, with respect to the corresponding region 2100 of the reference picture which is obtained by performing the motion estimation according to a unit of a first sub-pixel, a region 2110 may be obtained by correcting the corresponding region 2100 according to a unit of a second sub-pixel in up and down-right and left directions and then a motion compensation value may be obtained from the region 2110.

Referring back to FIG. 17, the second sub-pixel determining unit 1730 selects a corresponding region that has a smaller error with a current block and that is from among a first corresponding region that is of a reference picture indicated by a motion vector and that is obtained with respect to a sub-pixel in a first sub-pixel unit, and a second corresponding region that is of the current block and that is obtained with respect to a sub-pixel in a second sub-pixel unit. Information about the selected corresponding region is encoded by an entropy encoding unit, and in this regard, the information may be indicated by using position information of a second sub-pixel. In the exemplary embodiment of FIG. 20, values of 0 through 8 are respectively allocated to indicate the 8 second sub-pixels 2001 through 2009 in the second sub-pixel units which are adjacent to the first sub-pixel, and a position value of a finally selected second sub-pixel unit may be indicated by using the allocated value. Here, when correction is not performed according to the second sub-pixel unit, that is, when a sub-pixel 2005 indicated by the motion vector in the first sub-pixel unit is selected as the second sub-pixel, a value of 0 may be allocated as a position information of a second sub-pixel.

Figure 22:
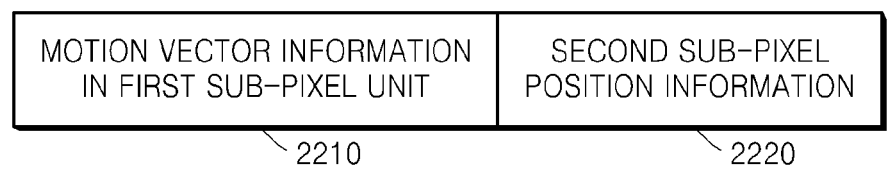
FIG. 22 illustrates motion vector information according to an exemplary embodiment.

FIG. 22 illustrates motion vector information 2200 according to an exemplary embodiment.

Referring to FIG. 22, the motion vector information 2200 of an encoded bitstream includes motion vector information in a first sub-pixel unit 2210 obtained by the motion estimating device 1400, and second sub-pixel position information 2220 determined by the motion compensating device 1700. As described above, when the first sub-pixel unit is the 1/4 sub-pixel unit, and the second sub-pixel unit is the 1/12 sub-pixel unit obtained by trisecting the gap between the 1/4 sub-pixel units, the 9 second sub-pixels 2001 through 2009 may be expressed by using allocated values of 0 through 8.

Figure 23:
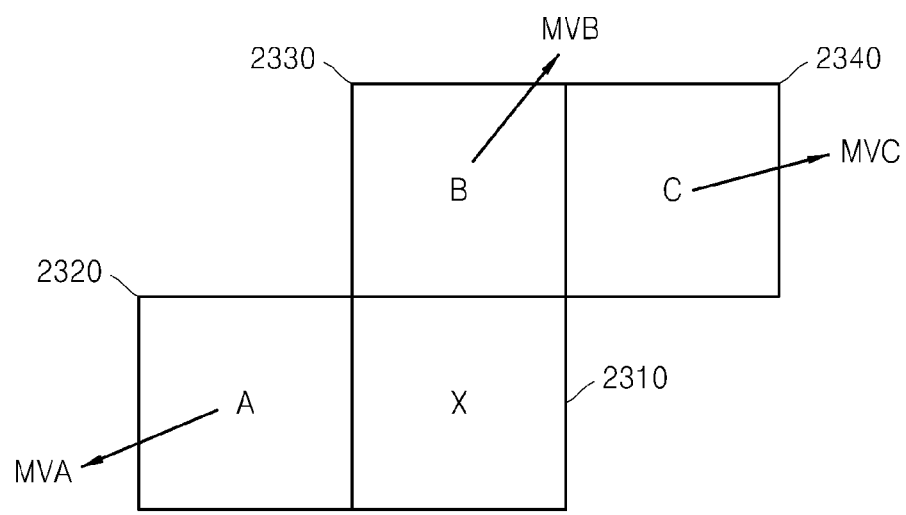
FIG. 23 is a diagram describing a motion vector estimation process according to an exemplary embodiment.

FIG. 23 is a diagram describing a motion vector estimation process according to an exemplary embodiment.

In general, a motion vector of a block highly depends on a motion vector of an adjacent block. Thus, by estimating a current block from the adjacent block and then encoding only a difference value thereof, it is possible to reduce an amount of bits to be encoded. In the present exemplary embodiment, an estimation result from the adjacent block may be used to encode the motion vector information in the first sub-pixel unit 2210 and the second sub-pixel position information 2220. In more detail, referring to FIG. 23, in order to encode the motion vector information in the first sub-pixel unit 2210, an estimation motion vector is generated by using a center value of a motion vector MVA of a left block A 2320, a center value of a motion vector MVB of an upper block B 2330, and a center value of a motion vector MVC of an upper right block C 2340, which are of a current block X 2310, and then only a difference value between the estimation motion vector and an actual motion vector in a first sub-pixel unit is encoded.

Since the second sub-pixel position information 2220 does not highly depend on the adjacent block, estimation of the second sub-pixel position information 2220 may be independently performed from the estimation of the motion vector in the first sub-pixel unit. As described in the above exemplary embodiment, in a case where the second sub-pixel unit is the 1/12 sub-pixel unit, and the values of 0 through 8 are allocated to the 9 selectable second sub-pixel units, respectively, position information of a sub-pixel in the second sub-pixel unit of a current block may be estimated by using position information of a sub-pixel in the second sub-pixel unit used in motion estimation and compensation of adjacent blocks of the current block, and only a difference value between the estimated position information of the sub-pixel in the second sub-pixel unit and position information of a selected sub-pixel in a second sub-pixel unit of the current block may be encoded. For example, in a case where values of 3, 4, and 5 are allocated to a plurality of pieces of position information of second sub-pixels which are used in motion estimation and compensation of upper, left, and upper right blocks that are adjacent blocks of a current block, an average value thereof, that is, 4, may be estimated as an estimation value of the position information of the sub-pixel in the second sub-pixel unit of the current block, and only a difference value between the estimation value and position information of an actual sub-pixel in the second sub-pixel unit may be encoded. However, as described above, the position information in the second sub-pixel unit does not highly depend on the adjacent block, so that the estimation process for encoding the position information in the second sub-pixel unit may be omitted.

Figure 24:
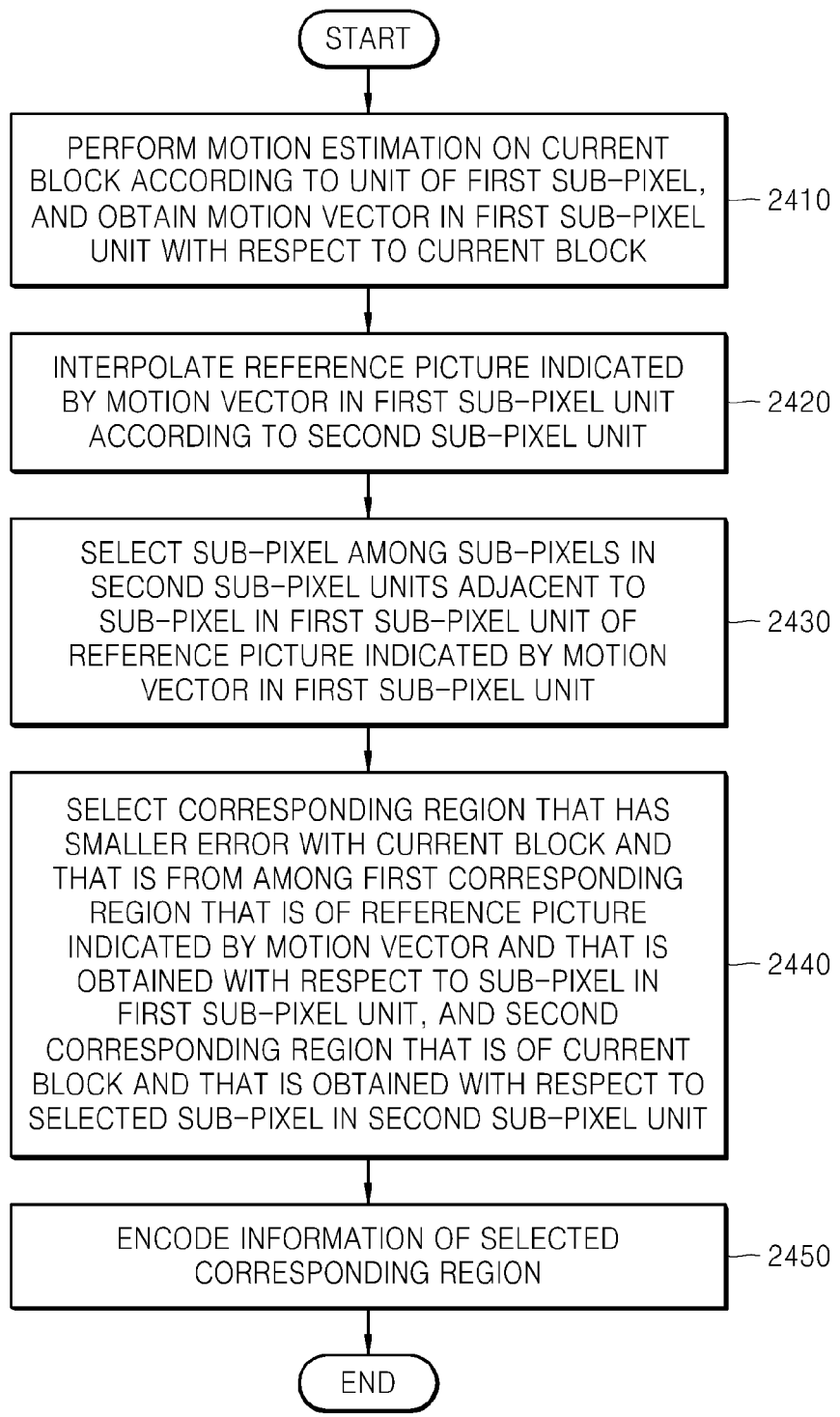
FIG. 24 is a flowchart illustrating a method of encoding video according to an exemplary embodiment.

FIG. 24 is a flowchart illustrating a method of encoding video according to an exemplary embodiment.

Referring to FIG. 24, in operation 2410, motion estimation is performed on a current block by a unit of a first sub-pixel, and a motion vector in a first sub-pixel unit is obtained with respect to the current block. As described above, the first sub-pixel unit may be determined according to an accuracy selected by the first sub-pixel unit selecting unit 1410 or may be determined according to an accuracy that is previously set between an encoder and a decoder.

In operation 2420, a reference picture indicated by the motion vector in the first sub-pixel unit is interpolated according to a second sub-pixel unit that is smaller than the first sub-pixel unit. As described above, the second sub-pixel unit may be obtained by partitioning the first sub-pixel unit according to an odd number. For example, when the first sub-pixel unit is $1/(2^p)$ (where p is an integer equal to or greater than 0), the second sub-pixel unit may be a $1/[(2a+1)*(2^p)]$ sub-pixel unit (where a is an integer equal to or greater than 1).

In operation 2430, by using the reference picture interpolated according to the second sub-pixel unit, a sub-pixel from among sub-pixels in the second sub-pixel units adjacent to a sub-pixel in the first sub-pixel unit of the reference picture indicated by the motion vector in the first sub-pixel unit is selected.

In operation 2440, a corresponding region that has a smaller error with the current block is selected from among a first corresponding region that is of the reference picture indicated by the motion vector and that is obtained with respect to the sub-pixel in the first sub-pixel unit, and a second corresponding region that is of the current block and that is obtained with respect to the selected sub-pixel in the second sub-pixel unit.

In operation 2450, information of the selected corresponding region is encoded by encoding information about the selected sub-pixel in the second sub-pixel unit and information about the motion vector in the first sub-pixel unit as motion vector information of the current block. As described above, with respect to encoding of the information about the motion vector in the first sub-pixel unit and position information of the second sub-pixel, only a difference value compared to an estimation value from an adjacent block may be encoded.

Figure 25:
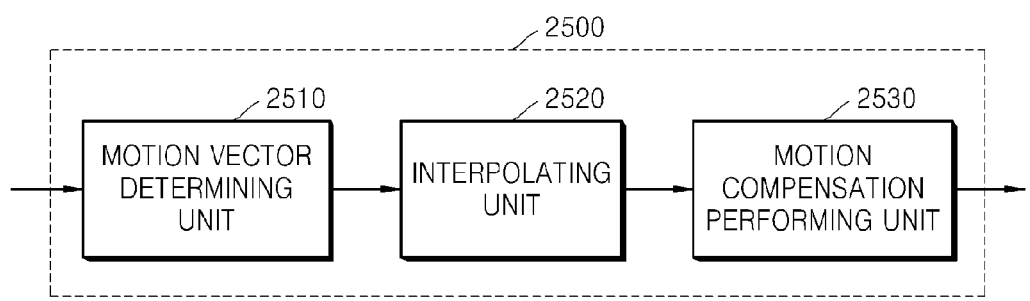
FIG. 25 is a block diagram illustrating a configuration of a motion compensating device according to an exemplary embodiment.

FIG. 25 is a block diagram illustrating a configuration of a motion compensating device 2500 according to an exemplary embodiment. The motion compensating device 2500 of FIG. 25 corresponds to the motion compensator 560 of FIG. 5.

Referring to FIG. 25, the motion compensating device 2500 includes a motion vector determining unit 2510, an interpolating unit 2520, and a motion compensation performing unit 2530.

The entropy decoder 520 of FIG. 5 decodes a motion vector, information, and position information from a bitstream and outputs them, wherein the motion vector is according to a first sub-pixel unit with respect to a current block, the information indicates whether motion compensation is performed on the current block by using a corresponding region obtained with respect to a sub-pixel in a second sub-pixel unit that is smaller than the first sub-pixel unit adjacent to a sub-pixel in the first sub-pixel unit of a reference picture indicated by the motion vector in the first sub-pixel unit, and the position information is of the sub-pixel in the second sub-pixel unit when the motion compensation is performed on the current block by using the corresponding region obtained with respect to the sub-pixel in the second sub-pixel unit.

The motion vector determining unit 2510 determines a motion vector of the current block to be decoded, by using the decoded motion vector in the first sub-pixel unit and the decoded position information of the sub-pixel in the second sub-pixel unit. That is, the motion vector determining unit 2510 determines the motion vector of the current block by correcting the motion vector in the first sub-pixel unit in a manner that the motion vector determining unit 2510 determines the sub-pixel in the second sub-pixel unit adjacent to the sub-pixel in the first sub-pixel unit of the reference picture indicated by the motion vector in the first sub-pixel unit, by using the position information of the sub-pixel in the second sub-pixel unit.

As described above, in a case where information about the motion vector in the first sub-pixel unit is encoded by using a difference value compared to an estimation value from an adjacent block, the motion vector determining unit 2510 generates the motion vector in the first sub-pixel unit by generating an estimation motion vector of the current block from motion vectors of decoded adjacent blocks and then by adding a difference value included in the bitstream to the estimation motion vector. With respect to the position information of the second sub-pixel, in a case where only an estimation value estimated from the adjacent blocks and a difference value are encoded, the motion vector determining unit 2510 may restore the position information of the second sub-pixel by estimating a value of the position information of the second sub-pixel from the decoded adjacent blocks and then adding a difference value included in the bitstream to the estimation value.

In this manner, the motion vector determining unit 2510 determines the motion vector of the current block by using the restored motion vector in the first sub-pixel unit and the restored position information of the second sub-pixel.

The interpolating unit 2520 interpolates the reference picture according to an accuracy of the motion vector of the current block determined by the motion vector determining unit 2510. For example, in a case where the motion vector of the current block is the motion vector in the first sub-pixel unit and the motion vector of the current block does not use the sub-pixel in the second sub-pixel unit, the interpolating unit 2520 interpolates the reference block according to the first sub-pixel unit. In a case where the motion vector of the current block is corrected according to the second sub-pixel unit, the interpolating unit 2520 interpolates the reference picture according to the second sub-pixel unit.

The motion compensation performing unit 2530 outputs an estimation block of the current block by performing motion compensation for obtaining a corresponding region indicated by the motion vector in the reference picture that is interpolated according to the accuracy of the motion vector of the current block.

FIG. 26 is a flowchart illustrating a method of decoding video according to an exemplary embodiment.

Referring to FIG. 26, in operation 2610, a motion vector in a first sub-pixel unit with respect to a current block is decoded and obtained from a bitstream.

In operation 2620, information is obtained from the bitstream, wherein the information indicates whether motion compensation is performed on the current block by using a corresponding region obtained with respect to a sub-pixel in a second sub-pixel unit that is smaller than the first sub-pixel unit adjacent to a sub-pixel in the first sub-pixel unit of a reference picture indicated by the motion vector in the first sub-pixel unit. As described above, in a case where the sub-pixel in the second sub-pixel unit is not used in correction of the motion vector, a value of 0 is allocated to position information of the second sub-pixel, so that it is possible to express whether the motion compensation is performed by using the sub-pixel in the second sub-pixel unit.

In operation 2630, it is determined whether the motion compensation is performed on the current block by using information of the corresponding region obtained with respect to the sub-pixel in the second sub-pixel unit. As a result of the determination in operation 2630, if the motion compensation is not performed according to the second sub-pixel unit, in operation 2640, an estimation block with respect to the current block is generated by performing the motion compensation by using the reference picture interpolated according to the first sub-pixel unit. As a result of the determination in operation 2630, if the motion compensation is performed according to the second sub-pixel unit, in operation 2650, position information of the sub-pixel in the second sub-pixel unit is extracted from the bitstream, and in operation 2660, a final motion vector of the current block is determined by using the motion vector in the first sub-pixel unit and the position information of the sub-pixel in the second sub-pixel unit, and an estimation block with respect to the current block is generated from the reference picture interpolated according to the second sub-pixel unit, by using the determined final motion vector.

According to one or more exemplary embodiments, it is possible to perform further accurate motion estimation without significantly increasing a computation load for the motion estimation.

An exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, one or more units of the above described encoding and decoding apparatuses can include a processor or microprocessor executing a computer program stored in a computer-readable medium.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A method of encoding video, the method comprising:
performing motion estimation on a current block according to a first sub-pixel unit, and obtaining a motion vector in the first sub-pixel unit with respect to the current block;
interpolating a reference picture indicated by the obtained motion vector according to a second sub-pixel unit smaller than the first sub-pixel unit;
selecting a second sub-pixel from among sub-pixels in the second sub-pixel unit adjacent to a first sub-pixel in the first sub-pixel unit of the reference picture indicated by the obtained motion vector, wherein the selecting is performed using the interpolated reference picture;
selecting a corresponding region that has a smaller error with the current block from among a first corresponding region and a second corresponding region, wherein the first corresponding region is of the reference picture indicated by the obtained motion vector and is obtained with respect to the first sub-pixel in the first sub-pixel unit, and the second corresponding region is of the current block and is obtained with respect to the selected second sub-pixel in the second sub-pixel unit; and
encoding information of the selected corresponding region,
wherein:
the current block is comprised in an image;
the image is hierarchically split from a plurality of maximum coding units according to the information about a maximum size of a coding unit into coding units of coded depths according to depths;
wherein a coding unit of a current depth is one of rectangular data units split from a coding unit of a upper depth;
wherein the coding unit of a current depth are split into coding units of a lower depth, independently from neighboring coding units; and
wherein the coding units of a hierarchical structure comprise encoded coding units among the coding units split from the maximum coding unit.

2. The method of claim 1, wherein the obtaining the motion vector comprises:
selecting, as the first sub-pixel unit, an accuracy from among at least two accuracies;
interpolating the reference picture according to the selected first sub-pixel unit; and
searching, in the interpolated reference picture, a most similar corresponding region to the current block, and obtaining the motion vector indicating a position of the searched corresponding region.

3. The method of claim 2, wherein the encoding the information comprises encoding accuracy information of the motion vector indicating the accuracy selected as the first sub-pixel unit from among the at least two accuracies.

4. The method of claim 2, wherein the at least two accuracies comprise a 1/4 sub-pixel unit and a 1/8 sub-pixel unit.

5. The method of claim 1, wherein, when the first sub-pixel unit is $1/(2^p)$, where p is an integer equal to or greater than 0, and the second sub-pixel unit is a $1/[(2a+1)*(2^p)]$ sub-pixel unit, where a is an integer equal to or greater than 0.

6. The method of claim 5, wherein the second sub-pixel unit is a 1/12 sub-pixel unit.

7. The method of claim 1, wherein the encoding the information comprises encoding information of the motion vector in the first sub-pixel unit, and information indicating whether the second corresponding region is selected.

8. The method of claim 7, wherein, when the second corresponding region is selected as the corresponding region, the encoding the information further comprises encoding position information of the selected second sub-pixel in the second sub-pixel unit.

9. The method of claim 8, wherein the encoding the position information comprises:
estimating the position information of the selected second sub-pixel in the second sub-pixel unit of the current block by using position information of a sub-pixel in the second sub-pixel unit used to estimate and compensate for motion of adjacent blocks to the current block; and
encoding a difference value between the estimated position information of the selected second sub-pixel in the second sub-pixel unit of the current block and the position information of the sub-pixel in the second sub-pixel unit used to estimate and compensate for the motion of adjacent blocks.

10. The method of claim 7, wherein the encoding the information further comprises:
obtaining an estimation motion vector of the current block by using a motion vector of an adjacent block to the current block; and
encoding a difference value between the obtained estimation motion vector of the current block and a motion vector of the current block.

11. A video encoding apparatus comprising:
a motion estimator which performs motion estimation on a current block according to a first sub-pixel unit, and obtains a motion vector in the first sub-pixel unit with respect to the current block;
a motion compensator which interpolates a reference picture indicated by the obtained motion vector according to a second sub-pixel unit smaller than the first sub-pixel unit, which selects, by using the interpolated reference picture, selecting a second sub-pixel from among sub-pixels in the second sub-pixel unit adjacent to a first sub-pixel in the first sub-pixel unit of the reference picture indicated by the obtained motion vector, and which selects a corresponding region that has a smaller error with the current block from among a first corresponding region and a second corresponding region, wherein the first corresponding region is of the reference picture indicated by the obtained motion vector and is obtained with respect to the first sub-pixel in the first sub-pixel unit, and the second corresponding region is of the current block and is obtained with respect to the selected second sub-pixel in the second sub-pixel unit; and
an encoder which encodes information of the selected corresponding region,
wherein:
the current block is comprised in an image;
the image is hierarchically split from a plurality of maximum coding units according to the information about a maximum size of a coding unit into coding units of coded depths according to depths;
wherein a coding unit of a current depth is one of rectangular data units split from a coding unit of a upper depth;
wherein the coding unit of a current depth are split into coding units of a lower depth, independently from neighboring coding units; and
wherein the coding units of a hierarchical structure comprise encoded coding units among the coding units split from the maximum coding unit.

12. The video encoding apparatus of claim 11, wherein the motion compensator performs motion estimation by selecting, as the first sub-pixel unit, an accuracy from among at least two accuracies and by interpolating the reference picture according to the selected first sub-pixel unit.

13. The video encoding apparatus of claim 12, wherein the encoder encodes accuracy information of the motion vector indicating the accuracy selected as the first sub-pixel unit from among the at least two accuracies.

14. The video encoding apparatus of claim 12, wherein the at least two accuracies comprise a 1/4 sub-pixel unit and a 1/8 sub-pixel unit.

15. The video encoding apparatus of claim 11, wherein, when the first sub-pixel unit is $1/(2^p)$, where p is an integer equal to or greater than 0, the second sub-pixel unit is a $1/[(2a+1)*(2^p)]$ sub-pixel unit, where a is an integer equal to or greater than 0.

16. The video encoding apparatus of claim 15, wherein the second sub-pixel unit is a 1/12 sub-pixel unit.

17. The video encoding apparatus of claim 11, wherein the encoder encodes information of the motion vector in the first sub-pixel unit, and information indicating whether the second corresponding region is selected.

18. The video encoding apparatus of claim 17, wherein, when the second corresponding region is selected as the corresponding region, the encoder encodes position information of the selected second sub-pixel in the second sub-pixel unit.

19. The video encoding apparatus of claim 17, wherein the encoder:
estimates the position information of the selected second sub-pixel in the second sub-pixel unit of the current block by using position information of a sub-pixel in the second sub-pixel unit used to estimate and compensate for motion of adjacent blocks to the current block; and
encodes a difference value between the estimated position information of the selected second sub-pixel in the second sub-pixel unit of the current block and the position information of the sub-pixel in the second sub-pixel unit used to estimate and compensate for motion of the adjacent blocks.

20. The video encoding apparatus of claim 17, wherein the encoder obtains an estimation motion vector of the current block by using a motion vector of an adjacent block to the current block, and encodes a difference value between the obtained estimation motion vector of the current block and a motion vector of the current block.

21. A method of decoding video, the method comprising:
decoding and obtaining a motion vector in a first sub-pixel unit with respect to a current block from a bitstream;
obtaining information from the bitstream, wherein the information indicates whether motion compensation is performed on the current block by using a corresponding region obtained with respect to a second sub-pixel in a second sub-pixel unit that is smaller than the first sub-pixel unit adjacent to a first sub-pixel in the first sub-pixel unit of a reference picture indicated by the obtained motion vector in the first sub-pixel unit;
if the motion compensation is performed on the current block by using information of the corresponding region obtained with respect to the second sub-pixel in the second sub-pixel unit, extracting position information of the second sub-pixel in the second sub-pixel unit from the bitstream; and
performing the motion compensation on the current block by using the motion vector in the first sub-pixel unit, and the extracted position information of the second sub-pixel in the second sub-pixel unit,
wherein:
the current block is comprised in an image;
the image is hierarchically split from a plurality of maximum coding units according to the information about a maximum size of a coding unit into coding units of coded depths according to depths;
wherein a coding unit of a current depth is one of rectangular data units split from a coding unit of a upper depth;
wherein the coding unit of a current depth are split into coding units of a lower depth, independently from neighboring coding units; and
wherein the coding units of a hierarchical structure comprise encoded coding units among the coding units split from the maximum coding unit.

22. The method of claim 21, wherein the obtaining the motion vector comprises:
obtaining an estimation motion vector by using a motion vector of an adjacent block to the current block; and
obtaining the motion vector in the first sub-pixel unit by using the obtained estimation motion vector of the current block, and a difference value between the estimation motion vector comprised in the bitstream and a motion vector of the current block.

23. The method of claim 21, wherein, when the first sub-pixel unit is 1/(2^p), where p is an integer equal to or greater than 0, the second sub-pixel unit is a 1/[(2 a+1)*(2^p)] sub-pixel unit, where a is an integer equal to or greater than 0.

24. The method of claim 23, wherein the second sub-pixel unit is a 1/12 sub-pixel unit.

25. The method of claim 21, wherein the extracting the position information comprises:
estimating the position information of the second sub-pixel in the second sub-pixel unit of the current block by using position information of a sub-pixel in the second sub-pixel unit used to estimate and compensate for motion of adjacent blocks to the current block; and
obtaining the position information of the second sub-pixel in the second sub-pixel unit of the current block by using the estimated position information of the second sub-pixel in the second sub-pixel unit, and a difference value between the estimated position information of the second sub-pixel in the second sub-pixel unit and the extracted position information of the second sub-pixel in the second sub-pixel unit extracted from the bitstream.

26. The method of claim 21, wherein the performing the motion compensation comprises:
interpolating the reference picture indicated by the motion vector in the first sub-pixel unit according to the second sub-pixel unit;
determining the second sub-pixel in the second sub-pixel unit adjacent to the first sub-pixel in the first sub-pixel unit of the reference picture indicated by the motion vector in the first sub-pixel unit, by using the extracted position information of the second sub-pixel in the second sub-pixel unit; and
obtaining a region corresponding to the current block with respect to the determined second sub-pixel in the second sub-pixel unit.

27. A video decoding apparatus comprising:
an entropy decoder which decodes and obtains a motion vector in a first sub-pixel unit with respect to a current block from a bitstream, which obtains information indicating whether motion compensation is performed on the current block by using a corresponding region obtained with respect to a second sub-pixel in a second sub-pixel unit that is smaller than the first sub-pixel unit adjacent to a first sub-pixel in the first sub-pixel unit of a reference picture indicated by the obtained motion vector in the first sub-pixel unit, and which, if the motion estimation is performed on the current block by using information of the corresponding region obtained with respect to the second sub-pixel in the second sub-pixel unit, extracts position information of the second sub-pixel in the second sub-pixel unit from the bitstream; and
a motion compensator which performs the motion compensation on the current block by using the motion vector in the first sub-pixel unit, and the extracted position information of the second sub-pixel in the second sub-pixel unit,
wherein:
the current block is comprised in an image;
the image is hierarchically split from a plurality of maximum coding units according to the information about a maximum size of a coding unit into coding units of coded depths according to depths;
wherein a coding unit of a current depth is one of rectangular data units split from a coding unit of a upper depth;
wherein the coding unit of a current depth are split into coding units of a lower depth, independently from neighboring coding units; and
wherein the coding units of a hierarchical structure comprise encoded coding units among the coding units split from the maximum coding unit.

28. The video decoding apparatus of claim 27, wherein the motion compensator obtains an estimation motion vector by using a motion vector of an adjacent block to the current block, and obtains the motion vector in the first sub-pixel unit by using the obtained estimation motion vector of the current block, and a difference value between the estimation motion vector comprised in the bitstream and a motion vector of the current block.

29. The video decoding apparatus of claim 27, wherein, when the first sub-pixel unit is 1/(2^p), where p is an integer equal to or greater than 0, the second sub-pixel unit is a 1/[(2a+1)*(2^p)] sub-pixel unit, where a is an integer equal to or greater than 0.

30. The video decoding apparatus of claim 29, wherein the second sub-pixel unit is a 1/12 sub-pixel unit.

31. The video decoding apparatus of claim 27, wherein the motion compensator:
estimates the position information of the second sub-pixel in the second sub-pixel unit of the current block by using position information of a sub-pixel in the second sub-pixel unit used to estimate and compensate for motion of adjacent blocks to the current block; and
obtains the position information of the second sub-pixel in the second sub-pixel unit of the current block by using the estimated position information of the second sub-pixel in the second sub-pixel unit, and a difference value between the estimated position information of the second sub-pixel in the second sub-pixel unit and the extracted position information of the second sub-pixel in the second sub-pixel unit extracted from the bitstream.

32. The video decoding apparatus of claim 27, wherein the motion compensator:
interpolates the reference picture indicated by the motion vector in the first sub-pixel unit according to the second sub-pixel unit;
determines the second sub-pixel in the second sub-pixel unit adjacent to the first sub-pixel in the first sub-pixel unit of the reference picture indicated by the motion vector in the first sub-pixel unit, by using the extracted position information of the second sub-pixel in the second sub-pixel unit; and
obtains a region corresponding to the current block with respect to the determined second sub-pixel in the second sub-pixel unit.

* * * * *